(12) United States Patent
Straub

(10) Patent No.: US 9,781,482 B2
(45) Date of Patent: *Oct. 3, 2017

(54) TECHNIQUES FOR UPGRADING SOFTWARE IN A VIDEO CONTENT NETWORK

(71) Applicant: Time Warner Cable Enterprises LLC, New York, NY (US)

(72) Inventor: Albert W. Straub, Westminster, CO (US)

(73) Assignee: TIME WARNER CABLE ENTERPRISES LLC, New York, NY (US)

( * ) Notice: Subject to any disclaimer, the term of this patent is extended or adjusted under 35 U.S.C. 154(b) by 13 days.

This patent is subject to a terminal disclaimer.

(21) Appl. No.: 14/020,863

(22) Filed: Sep. 8, 2013

(65) Prior Publication Data
US 2014/0013377 A1    Jan. 9, 2014

Related U.S. Application Data

(63) Continuation of application No. 12/573,526, filed on Oct. 5, 2009, now Pat. No. 8,533,771.
(Continued)

(51) Int. Cl.
*H04N 21/24*    (2011.01)
*H04N 21/485*    (2011.01)
(Continued)

(52) U.S. Cl.
CPC ....... *H04N 21/485* (2013.01); *H04N 21/2407* (2013.01); *H04N 21/27* (2013.01);
(Continued)

(58) Field of Classification Search
CPC ........... H04N 21/232; H04N 21/23406; H04N 21/2402; H04N 21/2407
(Continued)

(56) References Cited

U.S. PATENT DOCUMENTS 7,500,235 B2    3/2009   Maynard
8,127,041 B2    2/2012   Leung et al.
(Continued)

OTHER PUBLICATIONS

OpenCable App. Plat. Specs, OCAP 1.1 Profile, OC-SP-OCAP1.1.1-090612, downloaded from http://www.cablelabs.com/specifications/OC-SP-OCAP1.1.1-090612.pdf, pp. 1-257, Jun. 12, 2009.
(Continued)

*Primary Examiner* — Dominic D Saltarelli
(74) *Attorney, Agent, or Firm* — Otterstedt, Ellenbogen & Kammer, LLP

(57) ABSTRACT

It is determined that a substantial portion of set-top terminals connected to a video content network require a software upgrade. In-band video bandwidth (e.g., video-on-demand or switched digital video) is allocated for the software upgrade. The software upgrade is broadcast to the set-top terminals from a carousel in a first remote node of the video content network, via the allocated in-band video bandwidth, until a predetermined number of the set-top terminals have received the software upgrade. Subsequent to the predetermined number of set-top terminals receiving the software upgrade, the in-band video bandwidth is de-allocated and the software upgrade is made available out-of-band to the remaining portion of the set-top terminals, via individual sessions with an application server in a second remote node of the video content network. An exemplary system, which can implement the method, includes a controller, a dynamic bandwidth allocation device, the carousel, and the application server.

22 Claims, 15 Drawing Sheets

Related U.S. Application Data

(60) Provisional application No. 61/184,412, filed on Jun. 5, 2009.

(51) Int. Cl.
*H04N 21/434* (2011.01)
*H04N 21/4722* (2011.01)
*H04N 21/81* (2011.01)
*H04N 21/27* (2011.01)

(52) U.S. Cl.
CPC ..... *H04N 21/4349* (2013.01); *H04N 21/4722* (2013.01); *H04N 21/818* (2013.01); *H04N 21/8173* (2013.01)

(58) Field of Classification Search
USPC .................................................. 725/32, 152
See application file for complete search history.

(56) References Cited

U.S. PATENT DOCUMENTS

| | | |
|---|---|---|
| 8,533,771 B2 | 9/2013 | Straub |
| 2005/0055685 A1 | 3/2005 | Maynard |
| 2007/0121651 A1 | 5/2007 | Casey |
| 2007/0214477 A1 | 9/2007 | Read |
| 2007/0233854 A1 | 10/2007 | Bukovec et al. |
| 2008/0134165 A1 | 6/2008 | Anderson |
| 2009/0183219 A1 | 7/2009 | Maynard |
| 2009/0248794 A1 | 10/2009 | Helms |
| 2010/0313223 A1 | 12/2010 | Straub |
| 2010/0313235 A1 | 12/2010 | Straub |

OTHER PUBLICATIONS

OpenCable™ Specs, Common Download 2.0, OC-SP-CDL2.0-I08-090206, downloaded from http://www.cablelabs.com/specifications/OC-SP-CDL2.0-I08-090206.pdf Feb. 6, 2009.

FIG. 4

VERSION ASSOCIATION FILE (608)

| ORG ID (650) | APP ID (652) | APP TYPE (654) | LAUNCH ORDER (656) | TARGET TYPE (658) | TARGETS (660) |
|---|---|---|---|---|---|
| 34 | 6010 | MON_APP | | MAC_ADDR | 00:00:00:0A<br>00:00:00:0B |
| 34 | 6020 | MON_APP | | DEFAULT | |
| 78 | 4001 | START_APP | 1 | HUB_ID | 2 |
| 34 | 6100 | INIT_APP | 2 | MAC_ADDR | 00:00:00:0E |
| | | | | | |

FIG. 14

| VOD SERVICE GROUP - 4 RF CHANNELS | | | | QAM BANDWIDTH | |
|---|---|---|---|---|---|
| QAM 1 | QAM 2 | QAM 3 | QAM 4 | Mbps | |
| 28 | 32 | 36 |  | 37.5 | ↑ |
| 27 | 31 | 35 | 37 | 33.75 | HD RATE |
| 26 | 30 | 34 |  | 30 | 15 Mbps |
| 25 | 29 | 33 |  | 26.25 | ↓ |
| 21 | 22 | 23 | 24 | 22.5 | VType(1)_THRESHOLD |
| 17 | 18 | 19 | 20 | 18.75 | |
| 13 | 14 | 15 | 16 | 15 | |
| 9 | 10 | 11 | 12 | 11.25 | |
| 5 | 6 | 7 | 8 | 7.5 | |
| 1 | 2 | 3 | 4 | 3.75 | |

| SD | 3.75 Mbps | | HD | 15 Mbps |

FIG. 15

| VOD SERVICE GROUP - 4 RF CHANNELS | | | | QAM BANDWIDTH | |
|---|---|---|---|---|---|
| QAM 1 | QAM 2 | QAM 3 | QAM 4 | Mbps | |
| 30 |  |  | 34 | 37.5 | ↑ |
| 28 | 26 | 29 | 33 | 33.75 | HD RATE |
| 27 |  |  | 32 | 30 | 15 Mbps |
| 25 |  |  | 31 | 26.25 | ↓ |
| 21 | 22 | 23 | 24 | 22.5 | VType(1)_THRESHOLD |
| 17 | 18 | 19 | 20 | 18.75 | |
| 13 | 14 | 15 | 16 | 15 | |
| 9 | 10 | 11 | 12 | 11.25 | |
| 5 | 6 | 7 | 8 | 7.5 | |
| 1 | 2 | 3 | 4 | 3.75 | |

| SD | 3.75 Mbps | | HD | 15 Mbps |

TECHNIQUES FOR UPGRADING SOFTWARE IN A VIDEO CONTENT NETWORK

CROSS-REFERENCE TO RELATED APPLICATION(S)

This application is a continuation of U.S. application Ser. No. 12/573,526 filed Oct. 5, 2009, which in turn claims the benefit of U.S. Provisional Application Ser. No. 61/184,412, filed on Jun. 5, 2009. The complete disclosures of U.S. application Ser. No. 12/573,526 and U.S. Provisional Application Ser. No. 61/184,412 are both expressly incorporated herein by reference in their entireties for all purposes.

FIELD OF THE INVENTION

The present invention relates generally to the electrical, electronic, and computer arts, and more particularly relates to video content networks.

BACKGROUND OF THE INVENTION

With the advent of digital communications technology, many TV program streams are transmitted in digital formats. For example, Digital Satellite System (DSS), Digital Broadcast Services (DBS), and Advanced Television Standards Committee (ATSC) program streams are digitally formatted pursuant to the well known Moving Pictures Experts Group 2 (MPEG-2) standard. The MPEG-2 standard specifies, among other things, the methodologies for video and audio data compression allowing for multiple programs, with different video and audio feeds, to be multiplexed in a transport stream traversing a single transmission channel. A digital TV receiver may be used to decode an MPEG-2 encoded transport stream, and extract the desired program therefrom.

The compressed video and audio data are typically carried by continuous elementary streams, respectively, which are broken into access units or packets, resulting in packetized elementary streams (PESs). These packets are identified by headers that contain time stamps for synchronizing, and are used to form MPEG-2 transport streams. For digital broadcasting, multiple programs and their associated PESs are multiplexed into a single transport stream. A transport stream has PES packets further subdivided into short fixed-size data packets, in which multiple programs encoded with different clocks can be carried. A transport stream not only includes a multiplex of audio and video PESs, but also other data such as MPEG-2 program specific information (sometimes referred to as metadata) describing the transport stream. The MPEG-2 metadata may include a program associated table (PAT) that lists every program in the transport stream. Each entry in the PAT points to an individual program map table (PMT) that lists the elementary streams making up each program. Some programs are open, but some programs may be subject to conditional access (encryption), and this information (i.e., whether open or subject to conditional access) is also carried in the MPEG-2 transport stream, typically as metadata.

The aforementioned fixed-size data packets in a transport stream each carry a packet identifier (PID) code. Packets in the same elementary streams all have the same PID, so that a decoder can select the elementary stream(s) it needs and reject the remainder. Packet-continuity counters may be implemented to ensure that every packet that is needed to decode a stream is received.

A set-top terminal or the like in the home or other premises receives the compressed video and audio data. The set-top terminal typically runs various software applications.

SUMMARY OF THE INVENTION

Techniques are provided for upgrading software in a video content network.

In one aspect, an exemplary method includes the steps of determining that a substantial portion of set-top terminals connected to a video content network require a software upgrade; allocating in-band video bandwidth (e.g., video-on-demand or switched digital video) for the software upgrade; broadcasting the software upgrade to the set-top terminals from a carousel in a first remote node of the video content network, via the allocated in-band video bandwidth, until a predetermined number of the set-top terminals have received the software upgrade. A further step includes, subsequent to the predetermined number of the set-top terminals receiving the software upgrade, de-allocating the in-band video bandwidth and making the software upgrade available out-of-band, to a remaining portion of the set-top terminals, via individual sessions with an application server in a second remote node of the video content network.

In another aspect, an exemplary system for interacting with a plurality of set-top terminals over a video content network includes a controller configured to facilitate determining that a substantial portion of the set-top terminals connected to the video content network require a software upgrade; a dynamic bandwidth allocation device, coupled to the controller, configured to allocate in-band video bandwidth on the video content network for the software upgrade; a carousel, coupled to the controller and the dynamic bandwidth allocation device, configured to broadcast the software upgrade to the set-top terminals, via the allocated in-band video bandwidth, until a predetermined number of the set-top terminals have received the software upgrade; and an application server coupled to the dynamic bandwidth allocation device and the controller. The controller and the dynamic bandwidth allocation device are cooperatively configured such that, subsequent to the predetermined number of the set-top terminals receiving the software upgrade, the in-band video bandwidth is de-allocated and the software upgrade is made available out-of-band, to a remaining portion of the set-top terminals, via individual sessions with the application server over the video content network.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed.

One or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code for performing the method steps indicated. Furthermore, one or more embodiments of the invention or elements thereof can be implemented in the form of an apparatus including a memory and at least one processor that is coupled to the memory and operative to perform, or facilitate performance of, exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable recordable storage medium (or multiple such media).

Techniques of the present invention can provide substantial beneficial technical effects. For example, one or more embodiments may have one or more of the following advantages:

Reduce the amount of cable system bandwidth required to support a DSM-CC Object Carousel or other carousel system used for the purpose of upgrading application software.

Decrease the load placed on a more expensive, IP based, data distribution system
such as hypertext transfer protocol (HTTP) over DOCSIS or HTTP over Advanced DOCSIS Set-Top Gateway (ADSG) over DOCSIS.

These and other features and advantages of the present invention will become apparent from the following detailed description of illustrative embodiments thereof, which is to be read in connection with the accompanying drawings.

BRIEF DESCRIPTION OF THE DRAWINGS

FIG. 4 shows an exemplary version association file (VAF);

FIG. 6 is a functional block diagram showing non-limiting exemplary mechanisms for providing software to set top terminals and the like;

FIG. 14 shows a first exemplary session allocation; and

FIG. 15 shows a second exemplary session allocation.

DETAILED DESCRIPTION OF PREFERRED EMBODIMENTS

Figure 1:
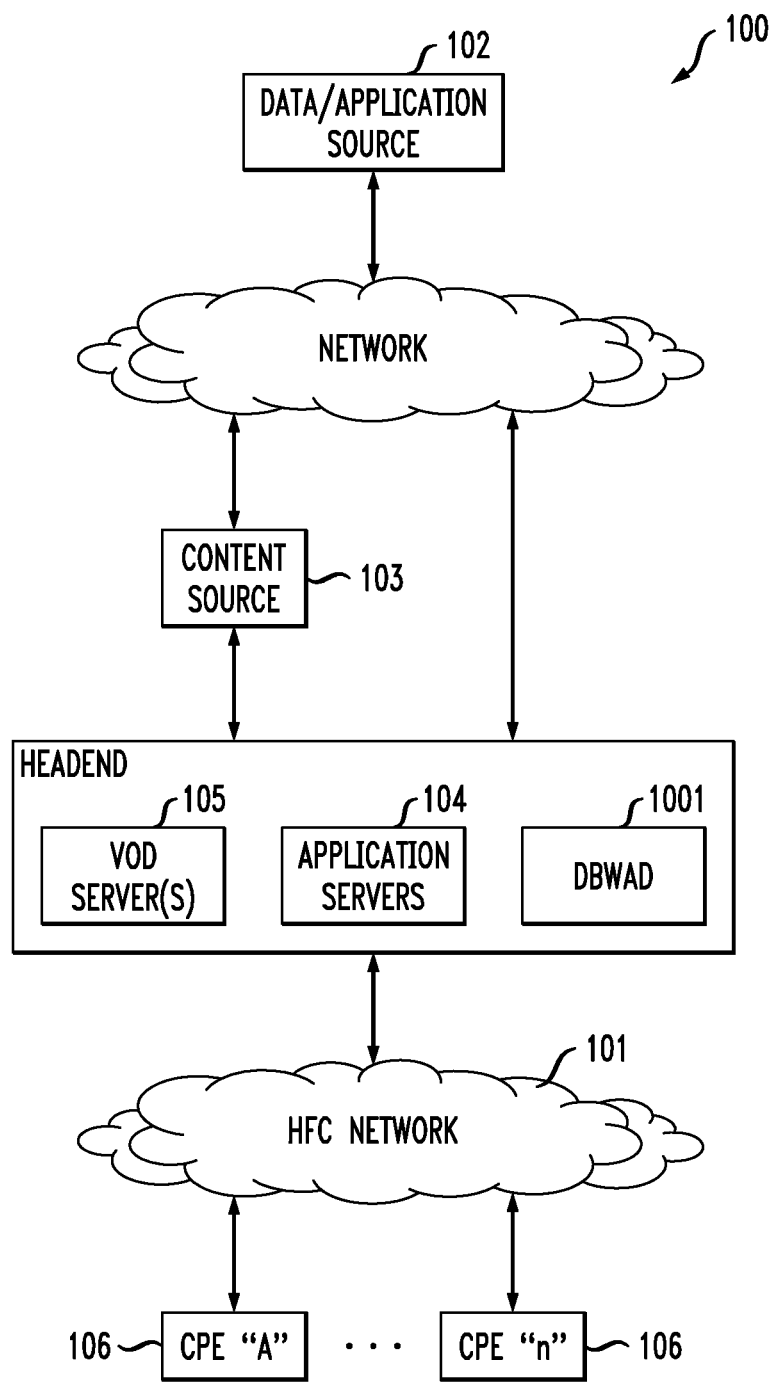
FIG. 1 is a functional block diagram illustrating an exemplary hybrid fiber-coaxial (HFC) network configuration useful with one or more embodiments of the present invention.

Initially, the complete disclosure of United States Patent Application Publication 2008/0134165 of Anderson et al. entitled "Methods and apparatus for software provisioning of a network device," published on Jun. 5, 2008, is expressly incorporated herein by reference in its entirety for all purposes. FIG. 1 illustrates a typical content-based network configuration 100 with which techniques of the present invention may be used. The various components of the network 100 include (i) one or more data and application origination points 102; (ii) one or more content sources 103, (iii) one or more application distribution servers 104; (iv) one or more video-on-demand (VOD) servers 105, and (v) consumer (or customer) premises equipment (CPE) 106. Also included is a dynamic bandwidth allocation device (DBWAD) 1001; non-limiting examples include a session resource manager or global session resource manager as discussed elsewhere herein. The distribution server(s) 104, VOD servers 105, DBWAD 1001, and CPE(s) 106 are connected via a bearer (e.g., HFC) network 101. A simple architecture is shown in FIG. 1 for illustrative brevity, although it will be recognized that comparable architectures with multiple origination points, distribution servers, VOD servers, and/or CPE devices (as well as different network topologies) may be utilized consistent with the invention. For example, the head-end architecture of FIG. 1a (described in greater detail below) may be used.

It should be noted at this point that in addition to a conventional HFC network or a switched digital network to be discussed below, other kinds of video content networks can be employed for network 101 (e.g., fiber-to-the-home (FTTH) or fiber-to-the-curb (FTTC)).

The data/application origination point 102 comprises any medium that allows data and/or applications (such as a VOD-based or "Watch TV" application) to be transferred to a distribution server 104. This can include for example a third party data source, application vendor website, compact disk read-only memory (CD-ROM), external network interface, mass storage device (e.g., Redundant Arrays of Inexpensive Disks (RAID) system), etc. Such transference may be automatic, initiated upon the occurrence of one or more specified events (such as the receipt of a request packet or acknowledgement (ACK)), performed manually, or accomplished in any number of other modes readily recognized by those of ordinary skill.

The application distribution server 104 comprises a computer system where such applications can enter the network system. Conventional distribution servers are well known in the networking arts.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the customers' premises (or other appropriate locations) that can be accessed by a distribution server 104; for example, set-top terminal (STT), digital set-top box (DSTB), set-top box (STB), or simply "box," and the like.

Figure 1A:
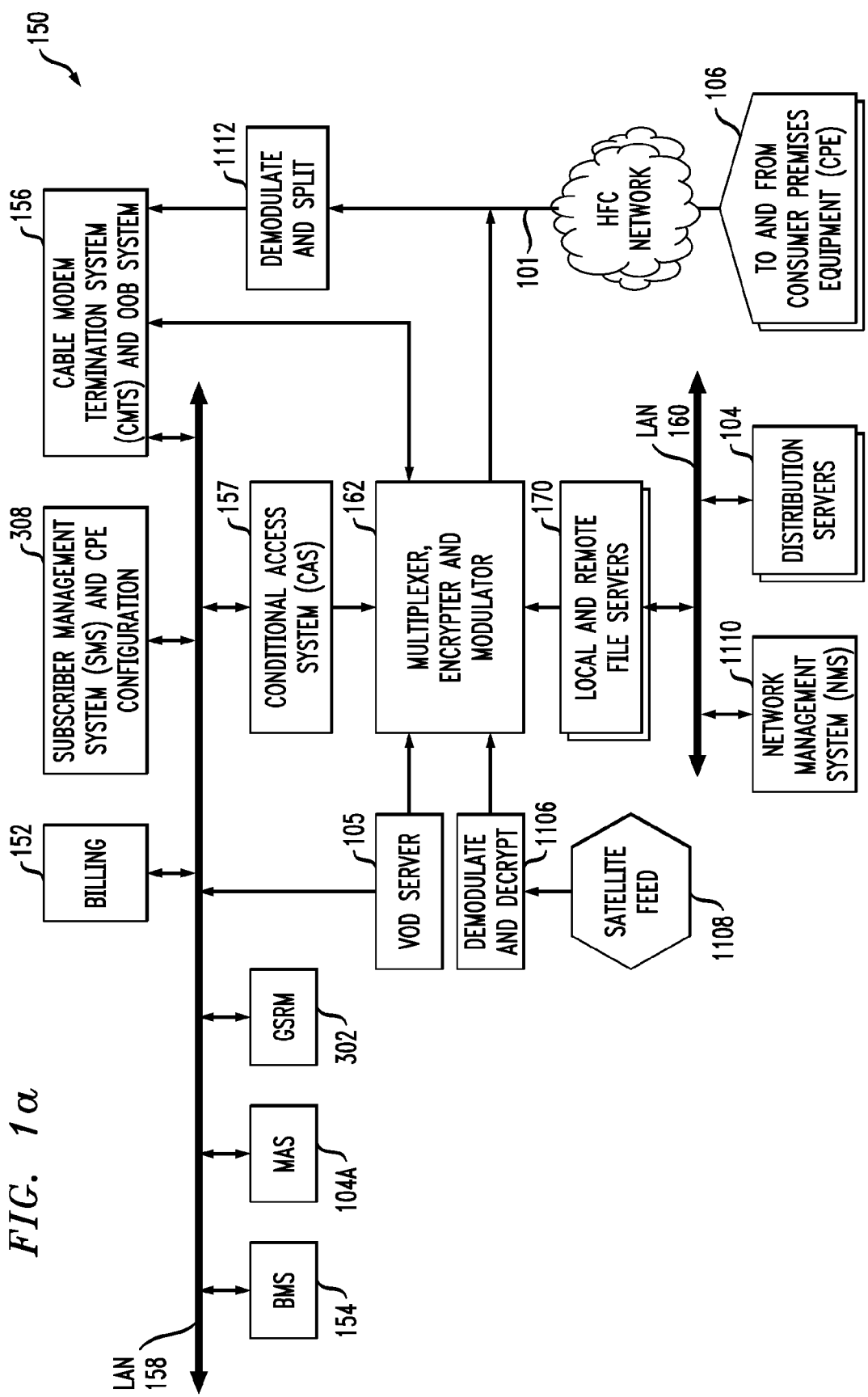
FIG. 1a is a functional block diagram illustrating one exemplary HFC cable network head-end configuration useful with one or more embodiments of the present invention.

Referring now to FIG. 1a, one exemplary embodiment of a head-end architecture useful with the present invention is described. As shown in FIG. 1a, the head-end architecture 150 comprises typical head-end components and services including billing module 152, subscriber management system (SMS) and CPE configuration management module 308, cable-modem termination system (CMTS) and out-of-band (OOB) system 156, as well as LAN(s) 158, 160 placing the various components in data communication with one another. It will be appreciated that while a bar or bus LAN topology is illustrated, any number of other arrangements (e.g., ring, star, etc.) may be used consistent with the invention. It will also be appreciated that the head-end configuration depicted in FIG. 1a is high-level, conceptual architecture and that each multi-service operator or multiple system operator (MSO) may have multiple head-ends deployed using custom architectures.

The architecture 150 of FIG. 1a further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 158 as well, although other architectures may be employed (such as for example where the VOD servers are associated with a core switching device such as an 802.3z Gigabit Ethernet device; or the VOD servers could be coupled to LAN 160). Since information is typically carried across multiple channels, the head-end should be adapted to acquire the information for the carried channels from various sources. Typically, the channels being delivered from the head-end 150 to the CPE 106 ("downstream") are multiplexed together in the head-end and sent to neighborhood hubs (see FIG. 1b) via a variety of interposed network components.

Content (e.g., audio, video, etc.) is provided in each downstream (in-band) channel associated with the relevant service group. To communicate with the head-end or intermediary node (e.g., hub server), the CPE 106 may use the out-of-band (OOB) or DOCSIS® (Data Over Cable Service Interface Specification) channels (registered mark of Cable Television Laboratories, Inc., 400 Centennial Parkway Louisville CO 80027, USA) and associated protocols. The OpenCable™ Application Platform (OCAP) 1.0, 2.0, 3.0 (and subsequent) specification (Cable Television laboratories Inc.) provides for exemplary networking protocols both downstream and upstream, although the invention is in no way limited to these approaches. All versions of the DOCSIS and OCAP specifications are expressly incorporated herein by reference in their entireties for all purposes.

It will also be recognized that multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

In some instances, material may also be obtained from a satellite feed 1108; such material is demodulated and decrypted in block 1106 and fed to block 162. Conditional access system 157 may be provided for access control purposes. Network management system 1110 may provide appropriate management functions. Note also that signals from MEM 162 and upstream signals from network 101 that have been demodulated and split in block 1112 are fed to CMTS and OOB system 156.

Figure 9:
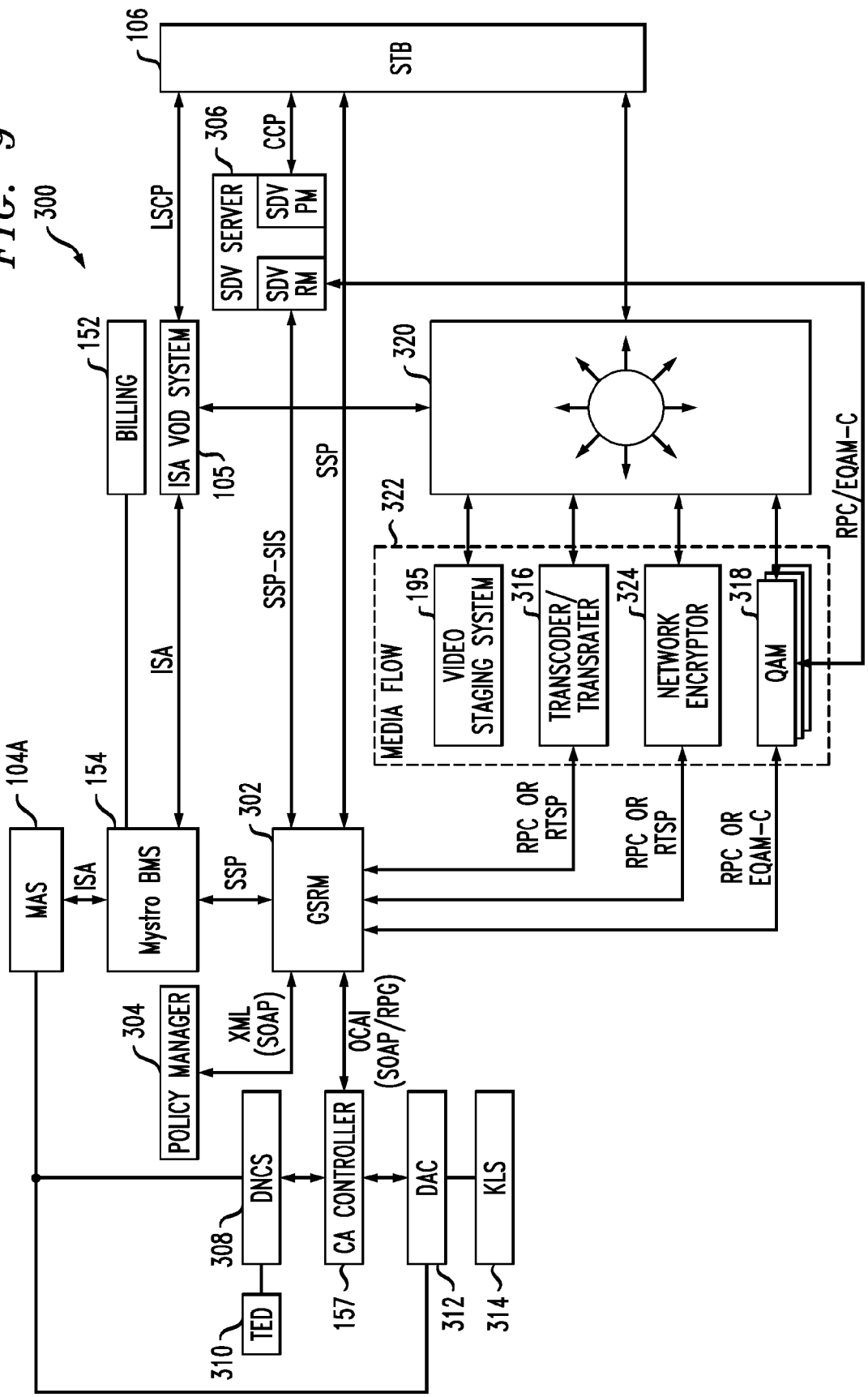
FIG. 9 is a functional block diagram of a video content network with a session resource manager.

Also included in FIG. 1a are a global session resource manager (GSRM) 302, a Mystro Application Server 104A, and a business management system 154, all of which are coupled to LAN 158, and discussed further below in connection with FIG. 9. GSRM 302 is a non-limiting example of a DBWAD 1001.

Figure 1B:
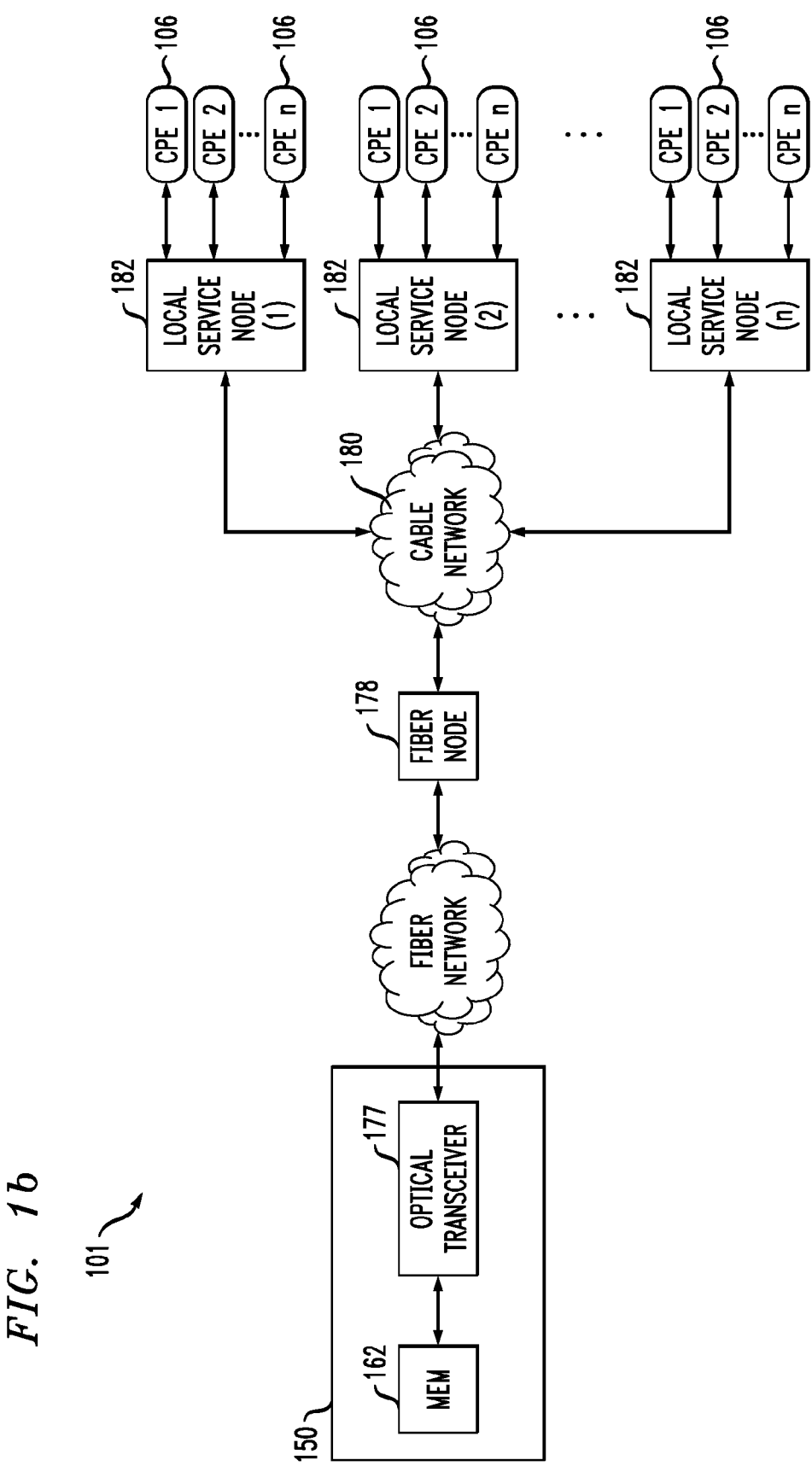
FIG. 1b is a functional block diagram illustrating one exemplary local service node configuration useful with one or more embodiments of the present invention.

As shown in FIG. 1b, the network 101 of FIGS. 1 and 1a comprises a fiber/coax arrangement wherein the output of the MEM 162 of FIG. 1a is transferred to the optical domain (such as via an optical transceiver 177 at the head-end or further downstream). The optical domain signals are then distributed to a fiber node 178, which further distributes the signals over a distribution network 180 to a plurality of local servicing nodes 182. This provides an effective 1:N expansion of the network at the local service end.

Figure 1C:
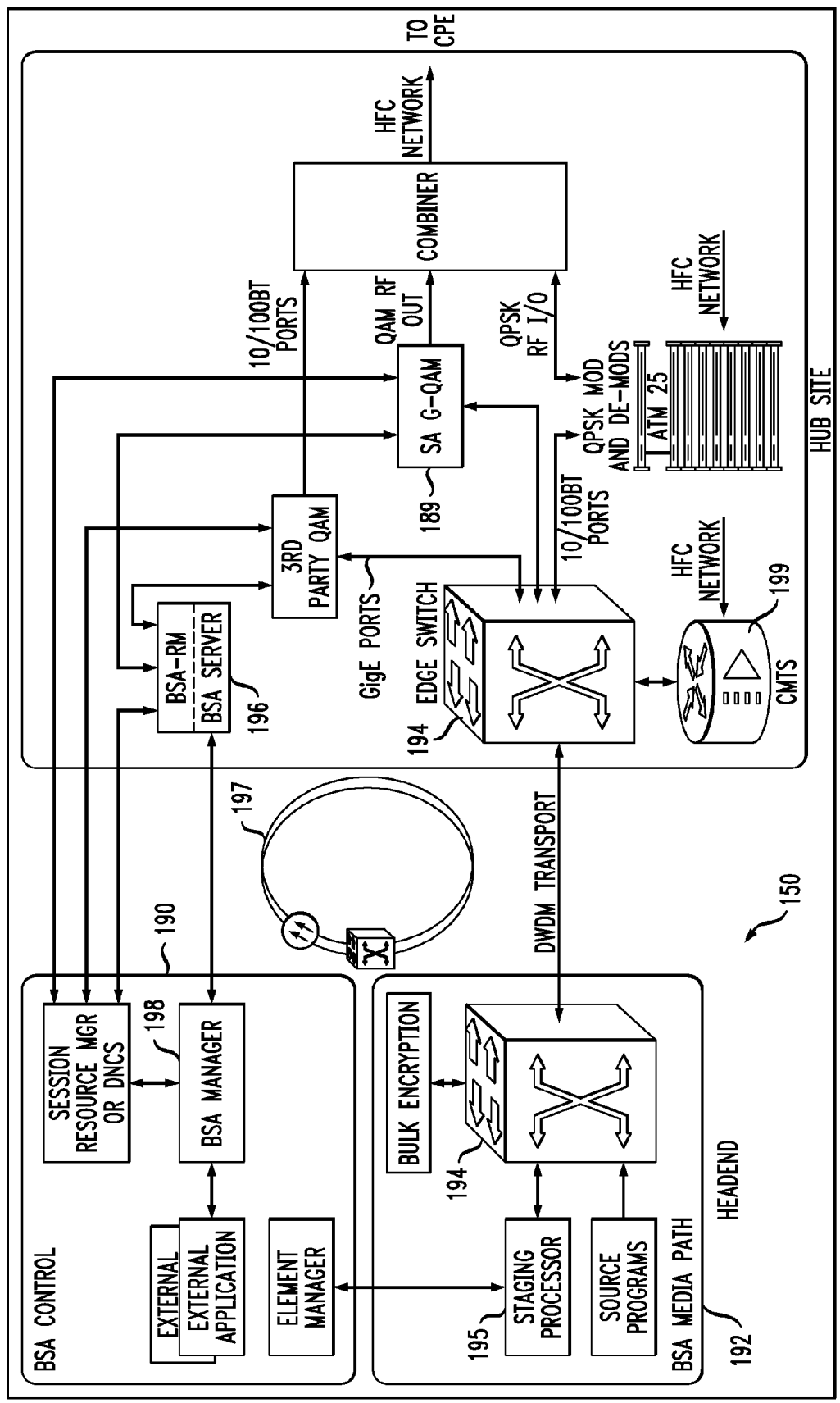
FIG. 1c is a functional block diagram illustrating one exemplary broadcast switched architecture (BSA) network useful with one or more embodiments of the present invention.

FIG. 1c illustrates an exemplary "switched" network architecture also useful with one or more embodiments of the present invention. While a so-called "broadcast switched architecture" or BSA network is illustrated in this exemplary embodiment, it will be recognized that the present invention is in no way limited to such architectures.

Switching architectures allow improved efficiency of bandwidth use for ordinary digital broadcast programs. Ideally, the subscriber will be unaware of any difference between programs delivered using a switched network and ordinary streaming broadcast delivery.

FIG. 1c shows the implementation details of one exemplary embodiment of this broadcast switched network architecture. Specifically, the head-end 150 contains switched broadcast control and media path functions 190, 192 (the latter including staging processor 195); these elements cooperate to control and feed, respectively, downstream or edge switching devices 194 at the hub site which are used to selectively switch broadcast streams to various service groups. One of those broadcast streams that can be switched is the Object Carousel. A BSA server 196 is also disposed at the hub site, and implements functions related to switching and bandwidth conservation (in conjunction with a management entity 198 disposed at the head-end). An optical transport ring 197 is utilized to distribute the dense wave-division multiplexed (DWDM) optical signals to each hub in an efficient fashion.

With respect to FIG. 1c, note that in some current head ends (e.g., those using technology from Motorola, Inc., Schaumburg, Ill., USA) there is no GSRM or SRM or digital network control system (DNCS); rather, VOD vendors implement required functionality in their own proprietary way. In other head end configurations, such as in those implemented by Time Warner Cable, Inc., New York, N.Y., USA, session resource management functionality, as described herein, can be employed. Accordingly, it should be understood that the embodiments herein are exemplary and non-limiting, and one or more embodiments of the invention can be implemented with a variety of different devices that are used to dynamically allocate bandwidth.

US Patent Publication 2003-0056217 of Paul D. Brooks, entitled "Technique for Effectively Providing Program Material in a Cable Television System," the complete disclosure of which is expressly incorporated herein by reference for all purposes, describes one exemplary broadcast switched digital architecture useful with one or more embodiments of the present invention, although it will be recognized by those of ordinary skill that other approaches and architectures may be substituted.

In addition to "broadcast" content (e.g., video programming), the systems of FIGS. 1a-1c may also deliver Internet data services using the Internet protocol (IP), although other protocols and transport mechanisms of the type well known in the digital communication art may be substituted. One exemplary delivery paradigm comprises delivering MPEG-based video content, with the video transported to user personal computers (PCs) (or IP-based set-top boxes (STBs)) over DOCSIS channels comprising MPEG (or other video codec such as H.264 or AVC) over IP over MPEG. That is, the higher layer MPEG- or other encoded content is encapsulated using an IP protocol, which then utilizes an MPEG packetization of the type well known in the art for delivery over the RF channels. In this fashion, a parallel delivery mode to the normal broadcast delivery exists; i.e., delivery of video content both over traditional downstream quadrature amplitude modulation (QAM) channels (QAMs) to the tuner of the user's STB or other receiver device for viewing on the television, and also as packetized IP data over the DOCSIS QAMs to the user's PC or other IP-enabled device via the user's cable modem.

Referring again to FIG. 1c, the IP packets associated with Internet services are received by edge switch 194, and forwarded to the cable modem termination system (CMTS) 199. The CMTS examines the packets, and forwards packets intended for the local network to the edge switch 194. Other packets are discarded or routed to another component. Note also that edge switch 194 in block 150 in FIG. 1c can, in the most general case, be the same or different as that shown in the hub site of FIG. 1c. Also, in other embodiments, CMTS 199 could be located in a place other than the hub site.

The edge switch 194 forwards the packets received from the CMTS 199 to the QAM modulator 189, which transmits the packets on one or more physical (QAM-modulated RF) channels to the CPEs. The IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

It will be appreciated that while some descriptions presented herein are described in the context of Internet services that include multicast and unicast data, there is potential applicability to other types of services that include multicast transmission of data delivered over a network having multiple physical channels or even virtual or logical channels. For example, switching between various physical channels that comprise a virtual channel, can itself be conducted according to the "switched" approach. As a simple illustration, if a first virtual channel is comprised of physical channels (e.g., QAMs) A, B and D, and a second virtual channel is comprised of QAMs C, E and F, a cable modem (CM) or other CPE can be configured to switch between the A/B/D and C/E/F virtual channels as if they were a single QAM.

Note that in some instances, the IP multicast tunnel could be used to distribute Object Carousel data. However, it is a more expensive option. MPEG over QAM is lower cost than IP over QAM (DOCSIS).

The configurations shown in FIGS. 1-1C are exemplary in nature and different approaches may be used in other embodiments; such other approaches may have more or less functionality (for example, high speed Internet data services might be omitted in some cases).

Figure 2:
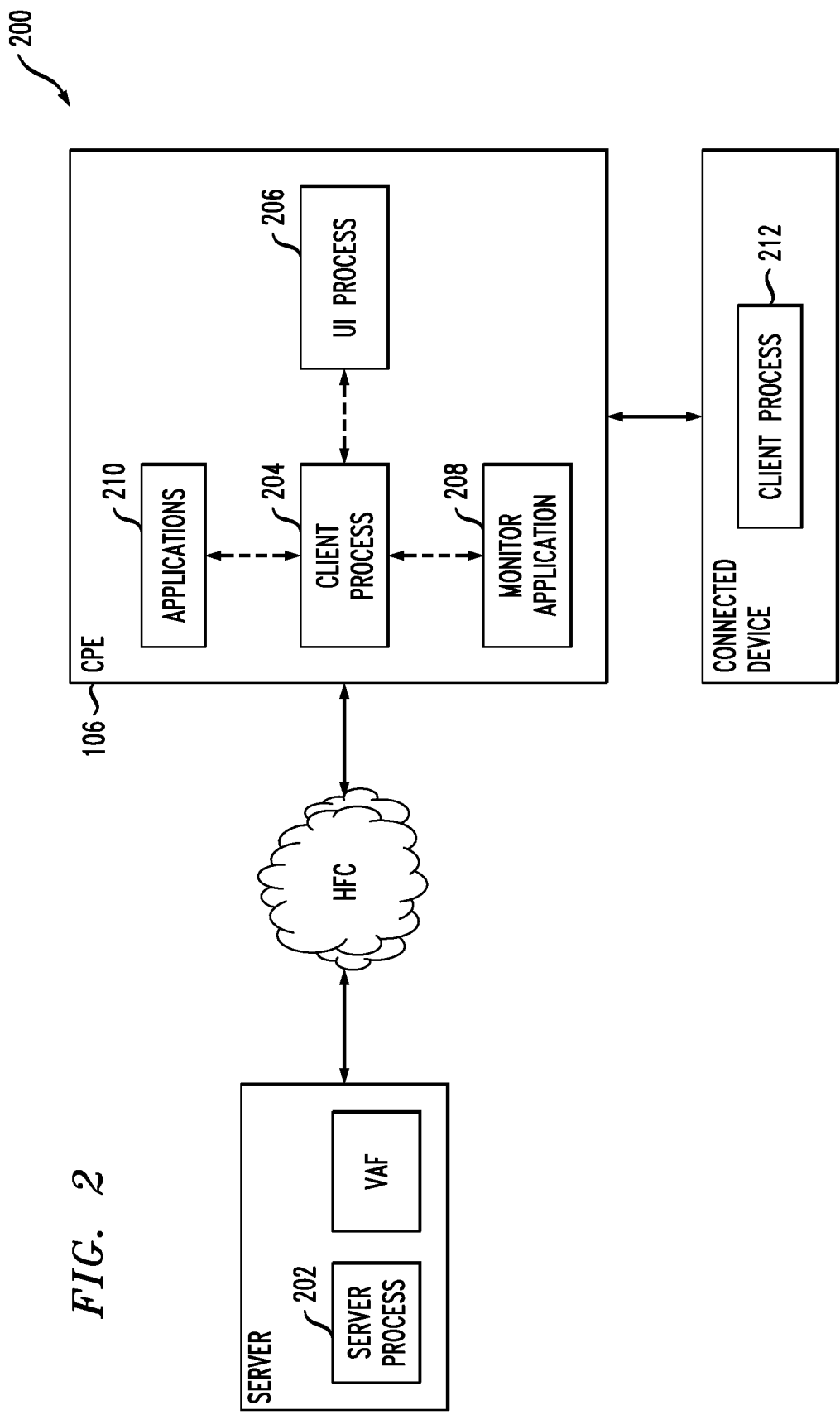
FIG. 2 is a functional block diagram depicting an illustrative software provisioning architecture in which techniques of the present invention may be used.

FIG. 2 illustrates one exemplary embodiment of a generalized software provisioning architecture. As shown in FIG. 2, the architecture 200 includes a "server" process 202, which may be disposed for example on a server or other device at the head-end 150 of the network, at a BSA switching hub (see FIG. 1c), or yet other location as desired. The server functionality may be integrated with one or more other existing components (e.g., an application server 104 as shown in FIG. 1). By disposing the server process 202 at the head-end, BSA hub, or some other node with connectivity to multiple CPE, the server process can advantageously service and provision multiple CPEs 106 simultaneously.

The "server" functionality may be provided by a number of existing components and/or processes already in place within the network, such as for example use of existing messaging facilities to generate and deliver the update messages, the use of a carousel function to select and download applications or other components, and so forth. Each of the foregoing features is described in greater detail subsequently herein.

In one or more embodiments, the server of FIG. 2 is a carousel server of some type. Thus, it continuously consumes bandwidth.

As shown in FIG. 2, a corresponding client process 204 is disposed on each CPE 106 (or a selected subset of all CPE); this process allows the CPE 106 to receive/send information from/to the server process 202, for e.g., determining the need for provisioning, remote configuration and provisioning of the CPE 106, monitoring of operations, statistics, status information, and the like. In one exemplary embodiment, the client process 204 is a "bootstrap" program or module that is installed on the CPE 106 and adapted to operate under certain circumstances.

The client portion 204 may also be in logical communication with other processes within the CPE, such as for example an OCAP-compliant monitor application or middleware 208, a user interface (and configuration) process 206, other applications 210 running on the CPE, and the like. Client processes 212 on other devices, such as a device coupled to the CPE 106 via a wireless or networking interface, can also communicate with the client process 204 if desired.

The CPE 106 may also include various other processes, such as a media server, web or http server, and so forth. These can be used in a stand-alone fashion (e.g., where a personal media device (PMD) in the premises network merely accesses the media server in order to obtain stored personal content from the CPE 106), or as a local proxy for other distant servers (such as a remote third party web server, and the like). Moreover, the CPE may take any number of forms, including for example a set-top box (e.g., DSTB); a converged device or "hive" as disclosed in US Patent Publication 2007/0217436 of Markley et al, entitled "Methods and apparatus for centralized content and data delivery," the complete disclosure of which is expressly incorporated herein by reference in its entirety for all purposes; a wireless satellite receiver; or even a mobile wireless device in direct or indirect data communication with the operator network domain.

Figure 3:
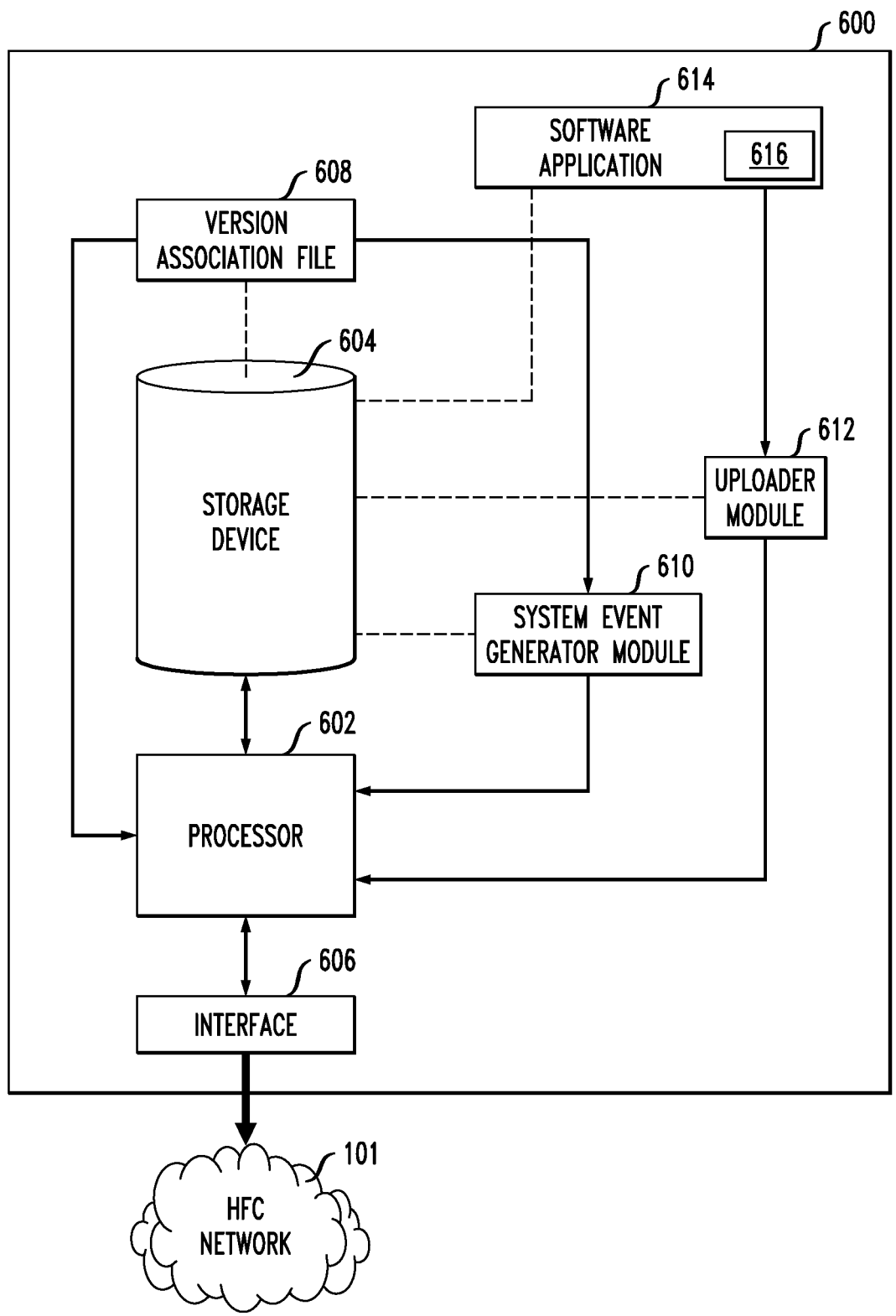
FIG. 3 is a functional block diagram of a server configured to provision CPE software.

FIG. 3 is a functional block diagram of an exemplary server 600 configured to transmit a software application 614 or other component to a CPE 106. A processor 602 resident on the server 600 is in data communication with a network interface 606 and a storage device 604. The storage device 604 comprises a non-volatile memory device such as a hard disk that is electrically coupled to the processor 602. Resident on the Storage Device 604 is a Version Association File (VAF) 608 or other comparable data structure that maps an application version 616 of a given software application 614 to a range of addresses corresponding to those CPE 106 that have been designated for that application version 616. The VAF is not necessarily present in all embodiments.

A system event generator module 610 is also present on the storage device 604. The system event generator module 610 may broadcast a DSM-CC catalog update message over the HFC Network 101 upon a modification to the Version Association File 608. The DSM-CC Catalog Update message may be transmitted to the CPE 106 along with the Version Association File 608 (or the two may be sent independently but in a substantially contemporaneous fashion). In other instances, only the DSM-CC catalog update message is sent to the CPE 106 upon a modification to the Version Association File 608. Of course, the invention is not limited to DSM-CC messages. For example, as an alternative (or in addition) to a DSM-CC message, an IP message can be used.

The software application 614 is present on the storage device 604 of the server, along with an uploader module 612 that is used to broadcast the application version 616 of the software application 614 over the HFC network 101. The CPE 106 downloads the application version 616 of the software application 614 if that CPE has been designated in the Version Association File 608 (for example, by address, MAC, TUNER ID, TUNER USE, opaque variable, etc.) and the application version 616 of the software application 614 is not already present on the CPE 106. US Patent Publication 2007/0022459 of Gaebel et al., entitled "Method and apparatus for boundary-based network operation," the complete disclosure of which is expressly incorporated herein by reference in its entirety for all purposes, describes exemplary approaches for implementing TUNER USE, TUNER ID, and opaque variables.

In one variant, the Version Association File 608 contains at least six fields: (i) an ORG ID 650, (ii) an App ID 652, (iii) an App Type 654, (iv) a Launch Order 656, (v) a Target Type 658, and (v) Targets 660. These fields are described in the aforementioned Anderson et al. publication 2008/0134165. These fields are illustrated in FIG. 4, along with four sample entries.

Again, for the avoidance of doubt, note that one or more embodiments of the invention do not require use of a VAF; nevertheless, information on same is provided for completeness.

The exemplary ORG ID 650 comprises a number uniquely assigned to the organization that created the software application 614 and can be used, for example, as a means of distinguishing proprietary software from software created by third parties. The ORG ID may be generated by a third party, indigenously by the MSO or other operator, according to an industry standard classification or identification system, or by the creating organization itself.

The exemplary App ID 652 comprises a numeric identifier that is a function of the software application 614 and the application version 616. For example, if three versions of an OCAP-compliant monitor application exist, and two versions of an ODN application exist, Monitor Version 1 could be assigned the App ID 652 of "6010," Monitor Version 3 could be assigned the App ID 652 of "6030," and ODN Version 2 could be assigned the App ID 652 of "7020." The App ID 652 can also used as a means for the CPE 106 to determine whether that CPE has the application version 616 of the software application 614 resident in its storage device (discussed in greater detail below).

The App Type 654 indicates the type of the software application 614. This is used to characterize groups of software applications according to certain criteria. For example, a designation of "MON_APP" indicates that the software application 614 is a monitor application. "POD_APP" indicates the application 614 is a POD Handler application. "INIT_APP" indicates that the software application 614 is to be started by the monitor, and the monitor must wait for completion of the software application 614 before launching other applications. "START_APP" indicates that the software application 614 is to be started by the monitor, but the monitor is not to wait for completion of the software application 614. "BLOCK_APP" is used to designate that the software application 614 is not to be started by the CPE 106; e.g., typically small selected groups of CPE or individual CPE. Alternatively, in the exemplary case of OCAP applications, the item can simply be removed from the XAIT, thereby causing it to be removed from all CPE 106. Optionally, other designation types, forms, and functions may also be specified in accordance with this and other embodiments.

The Launch Order 656 comprises a numeric value that indicates the chronological or sequential order in which the software application 614 is to be launched on the CPE 106. In one embodiment, the Launch Order 656 indicates the order in which "START_APP" and "INIT_APP" are to be launched.

The Target Type 658 is a mechanism for categorizing the CPE 106 by address. The Target Type can take on the values such as "MAC_ADDR" to designate the CPE by a unique MAC Address 710, "HUB_ID" (or other group identifier, such as GROUP_ID) to designate the CPE by the identifier of the hub it is connected to (known as a Hub ID 711), or "DEFAULT" to designate the CPE if it has not been designated by the MAC Address 710 or the Hub ID 711. As previously noted, the identification can be conducted using other parameters, such as TUNER ID, TUNER USE, or an opaque variable such as that obtained using a one-way cryptographic hash (e.g., SHA-1) of the CPE identifying information. For example, the second entry in FIG. 4 indicates that all CPE 106 that do not have a MAC Address of 00:00:00:00:0A or 00:00:00:00:0B are designated for a Monitor Application 708 with the App ID of 6020 (i.e. Monitor Version 2).

The Targets 660 are addresses of the CPE. In the illustrated embodiment, this value is at least one of the MAC Address 710, the Hub ID 711, or empty (if specifying a default target type, i.e. the remainder of set-top boxes not already designated by the MAC Address 710 or the Hub ID 711). The entry specified as a Targets 660 should correspond to the Target Type 658.

The VAF is thus useful, for example, when it is desired to try a new version of software on a relatively small number of set-top terminals, for test purposes or the like.

Figure 5:
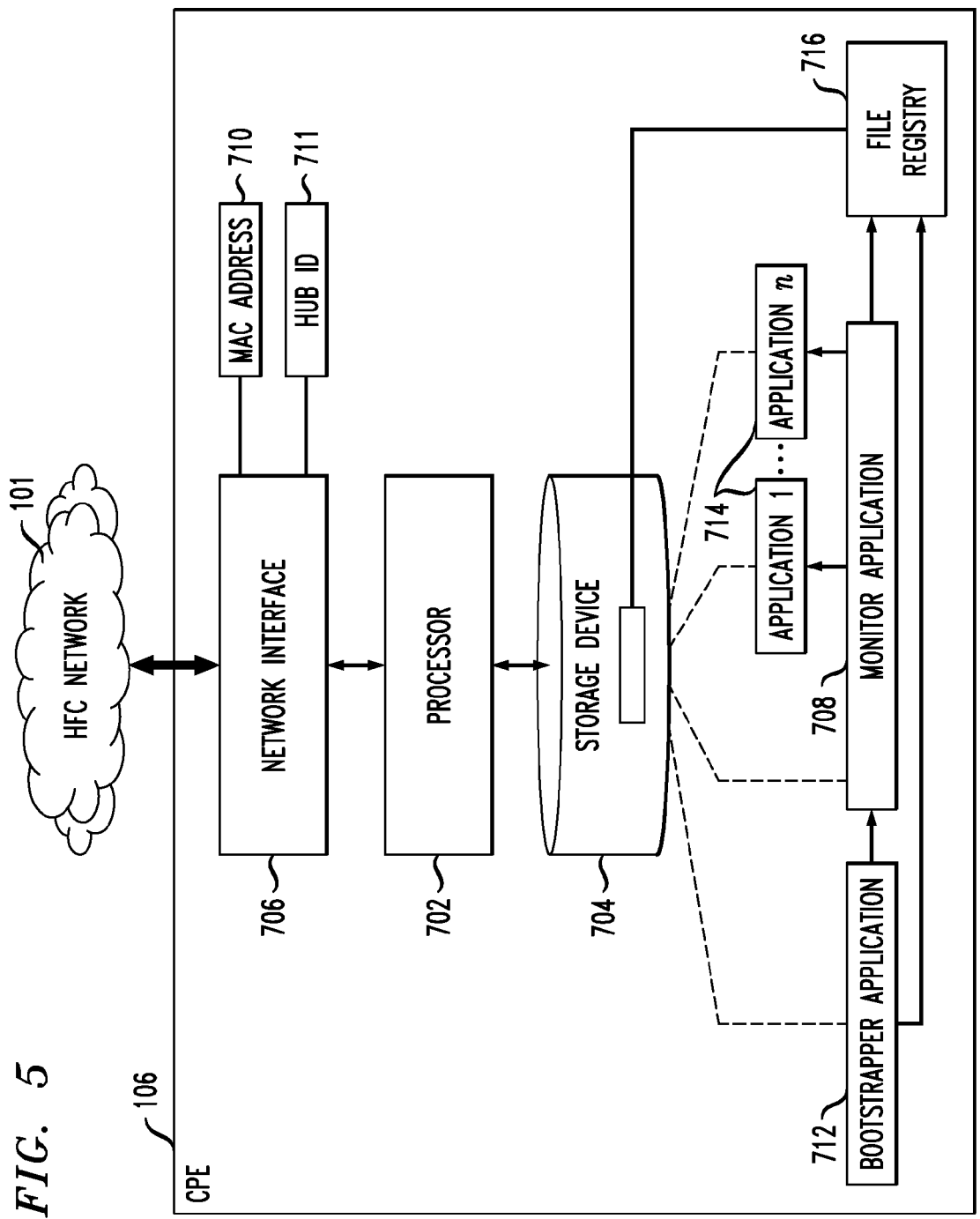
FIG. 5 is a functional block diagram depicting exemplary customer premises equipment.

FIG. 5 illustrates a functional block diagram of an exemplary CPE 106 configured to implement the download and provisioning methods. As shown in FIG. 5, a processor 702 resident on the CPE 106 is in data communication with the network interface 706 and a storage device 704. The processor 702 is used to execute instructions such as those instructions used in communicating with the network interface 706 and those instructions used for loading and storing data to the storage device 704, as is well known in the electronic arts. The network interface 706 manages data transmitted and received over, e.g., the HFC Network 101, and comprises the MAC Address 710 and the Hub ID 711. Depending on the network topology and delivery mechanism used, the interface 706 may comprise any number of different modalities including without limitation a radio frequency tuner stage (and de-multiplexer (demux)) of the type well known in the art, a DOCSIS or other cable modem, an IP interface, 802.3 Ethernet interface, 802.11 WiFi interface, and so forth. The data, applications, or content received by the CPE 106 via the interface is stored on the storage device 704.

In one embodiment, the storage device 704 is a non-volatile memory device such as a hard disk that is in data communication with the processor 702. Resident on the storage device 704 is a bootstrap application 712, a monitor application 708, a file registry 716, and optionally, one or more of the application versions 616 of one or more software applications 614, 714 previously described. The exemplary file registry 716 is a table of numeric entries assigned to each of the application versions 616 of each of the software applications 614, 714 currently installed in the CPE or connected devices. The aforementioned Anderson et al. Publication 2008/0134165 describes a bootstrap application 712 and monitor application 708. Given the teachings herein, the skilled artisan will be able to modify the bootstrap and/or monitor applications of the Anderson et al. publication to implement one or more embodiments of the invention.

One or more embodiments of the invention pertain to techniques for upgrading software in a video content network; for example, software on a set top terminal of such a network. In a non-limiting example, Tru2way® technology (registered trademark of Cable Television Laboratories, Inc., 858 Coal Creek Circle, Louisville Colo. 80027 USA) is employed for the video content network and/or one or more associated components, such as the set top terminal; that is, the video content network and/or one or more associated components are configured in accordance with an applicable version of the OpenCable Application Platform (OCAP) standards, e.g., versions 1.0 or 2.0 thereof, as promulgated by Cable Television Laboratories, Inc.

A system that supports an OCAP television or set top host is typically required to distribute new versions of software to the set-top boxes (STBs). In some instances, the software to be distributed to the STBs may be classified into at least two different types. A first type is software that is provided by the host manufacturer and is unique to each manufacturer. It may contain hardware driver components, the operating system, and a Java Virtual Machine, or an alternative software development platform. Each middleware component is stacked upon the other and is often referred to as a software stack. A second type of software is that which provides the actual application and user interface. This software is preferably written in a platform-independent language, such as Java, as specified, for example, by the OCAP specification set forth in the document entitled "OpenCable Application Platform Specifications, OCAP 1.1 Profile," Document Control No. OC-SP-OCAP1.1.1-090612, published Jun. 12, 2009 by Cable Television laboratories, Inc., and corresponding revisions thereto, the complete contents of which are expressly incorporated by reference herein for all purposes.

Both types of software have upgrade mechanisms defined within the OpenCable standards. The software stack is preferably upgraded using the Common Download specification, as set forth in the document entitled "OpenCable™ Specifications, Common Download 2.0," Document Control No. OC-SP-CDL2.0-I08-090206, Revision I08, published Feb. 6, 2009 by Cable Television laboratories, Inc., and corresponding revisions thereto, the complete contents of which are expressly incorporated by reference herein for all purposes. The Java application is distributable, for example, by at least two different illustrative mechanisms.

Figure 6:
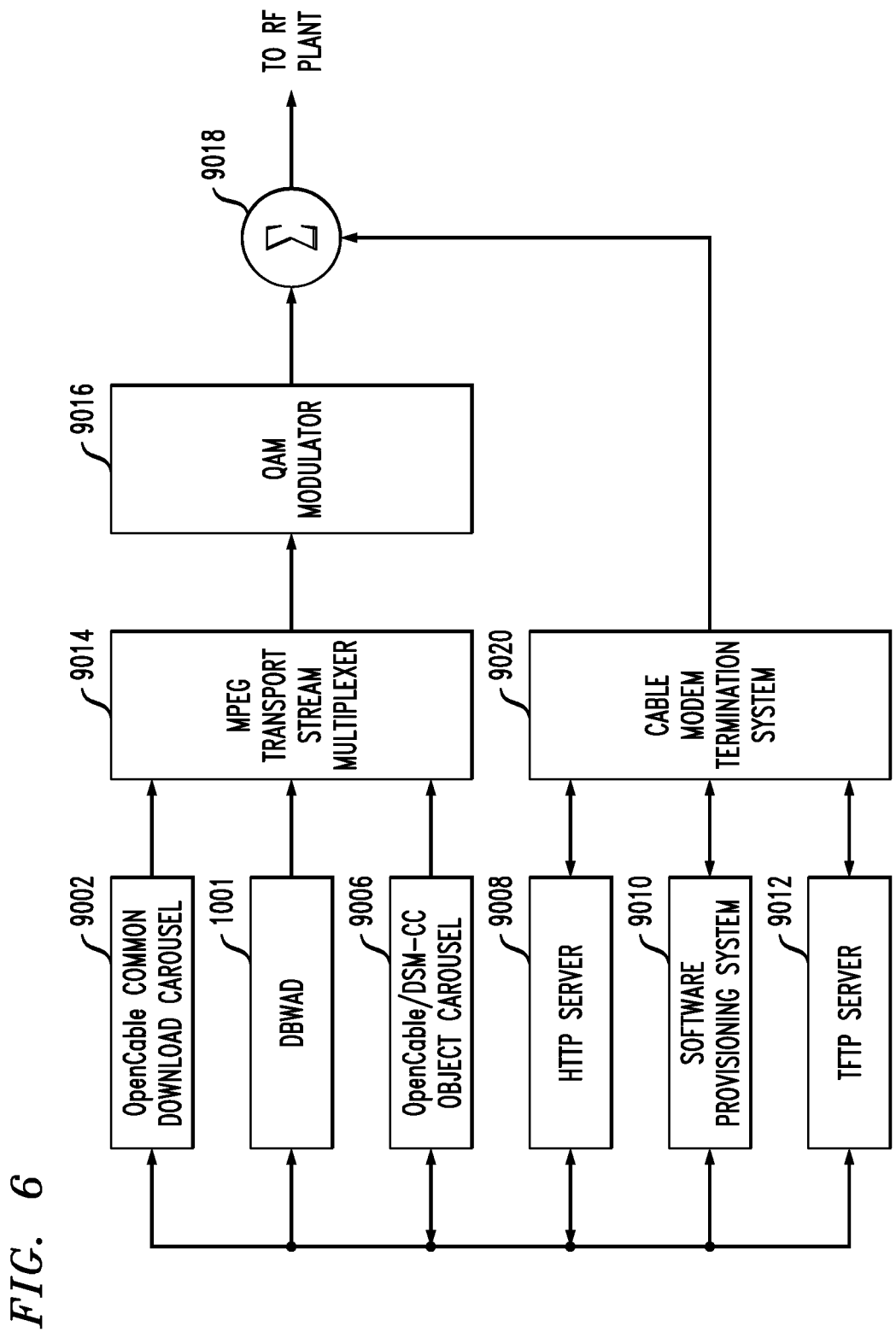

With reference now to FIG. 6, a first mechanism for distributing the Java application uses an OCAP-compliant object carousel 9006. The object carousel 9006 is preferably operative as a clocked, retransmitting, first-in, first-out (FIFO) apparatus or data structure, or an alternative queue processing apparatus or structure, in that it transmits the contents of a file at a specific data rate and upon completion starts again at the beginning of the file. A second mechanism for distributing the Java application is by using the Internet Protocol (IP) and HTTP (e.g., HTTP server 9008).

In one or more embodiments, bandwidth for video-on-demand (VOD), switched digital video (SDV) and the like is allocated via DBWAD 1001 (for example, a GSRM, SRM, or equivalent dynamic bandwidth allocation server/process).

The Object Carousel mechanism is more bandwidth efficient when a large number of devices need to be updated. The process works as follows. A new software image is loaded into the Object Carousel 9006. A signal is presented to all of the hosts (set-top terminals) by a change to the OpenCable eXtended Application Information Table (XAIT), use of which is described above, in the aforementioned Anderson et al. Publication 2008/0134165 and OCAP standards. The table is broadcast to all hosts (set top boxes) through a secondary channel known as the Out Of Band (OOB) channel. All of the hosts parse the XAIT, see the change, and remove the currently executing software. All of the hosts determine from the XAIT that the new software is available from the Object Carousel 9006, and load the software from the carousel. All of the hosts start the newly installed software. The process is more efficient when large numbers of hosts need an upgrade, because hundreds of thousands of hosts can receive the software image from the same broadcast stream. Each host does not have to go through a request/receipt cycle with a server. The skilled artisan will be familiar with the XAIT per se, and given the teachings herein, will be able to modify same to implement one or more embodiments of the invention.

The HTTP mechanism is referred to as the "Interaction Channel" in the OCAP specification. The process is the same as just described, except that all of the hosts determine that the software is available on the HTTP server 9008 and all of them decide to attempt to load it at the same time. This causes the HTTP server to be overwhelmed by individual requests. As an example, if the size of the software image were 10 Megabytes, and 200,000 devices requested the software, then the required amount of network traffic would be 10 Megabytes times 200,000 or 2 Terabytes.

If the hosts were required to set a timer based on a random number and wait that random number of minutes before performing the request, overwhelming the server 9008 all at once could be avoided; however, the amount of traffic would still be the same.

Object carousels 9006 can be constrained to transmit data at various rates. The rates are generally in the 2 Megabits per second range. The maximum data rate for a carousel is in the range of 38 Megabits per second. The maximum data rate is determined by the maximum data rate of the physical transport layer; in the non-limiting example of network 101, the physical transport layer is the QAM (in particular, QAM-256 provides 38 Mbps; QAM-512 or QAM 1024 may be employed in other instances), as discussed above. OCAP host devices generally cannot consume data at a rate of greater than several Megabits per second due to processor speed constraints. For this reason, the maximum bandwidth of the channel is usually divided up into multiple object carousels, each running at a rate of about 2 Megabits per second.

Video-on-Demand (VOD) is a service in which a given amount of bandwidth is typically pre-allocated on a given physical transport layer (usually QAM radio frequency (RF)); for example, by DBWAD 1001 as discussed elsewhere herein. When a viewer desires to watch a video, a portion of that bandwidth is allocated, approximately 3.75 Megabits per second for standard definition (SD) video and 10 to 20 Megabits per second for high definition (HD) video, and the digital video data is sent down the transport layer. The host (e.g., STB) is then instructed by the VOD player (e.g., VOD server 105) to tune to this RF frequency and select the correct streaming data for decoding and display. In such cases, the instructions may be sent via DSM-CC, RTP (real time transport protocol), RTSP (real time streaming protocol), or a proprietary mechanism, for example. In an Interactive Services Architecture (ISA) environment, the host may be instructed by DBWAD 1001 using Session Setup Protocol. In both cases, tuning information is returned in the response. The skilled artisan will be familiar with ISA per se, and, given the teachings herein, will be able to employ same to implement one or more embodiments of the invention. When a sufficient number of users do not request VOD, then the bandwidth that is not used lies idle. VOD server 105, omitted from FIG. 8 to avoid clutter, may provide the VOD service.

In some instances, a controller 9010, such as the Mystro Application Server (MAS), can be provided for purposes of software provisioning system control. Note that the Mystro Application Server, commercially available from Time Warner Cable, Inc., New York, N.Y., USA, is but one non-limiting example of a software provisioning system 9010, suitable for carrying out desired control. The elements in FIG. 6 may be located in head end 150. For example, servers 9008, 9012 may be forms of application distribution servers 104. Elements 9014 and 9016 may correspond to MEM 162. CMTS 9020 may correspond to CMTS 156. Summer 9018 combines the material from the CMTS 9020 and QAM modulator 9016 so that it can be placed on the network 101. Using a controller 9010, bandwidth sufficient to deliver the new Java (or other application) code can be requested from the DBWAD 1001. This request forces this bandwidth to be marked as allocated and it will not be used for any other service that temporarily allocates system bandwidth, e.g., VOD, switched digital video, and the like. The controller 9010 then activates one or more object carousels 9006, loads the new code on them, and causes them to begin transmitting the new code within the newly allocated, previously VOD bandwidth. The controller 9010 then causes the XAIT to be transmitted to the set top boxes, most or all of which upgrade from the Object Carousel 9006 at the same time.

After a pre-determined amount of time, or as triggered by the receipt of messages from the set top boxes indicating that a sufficient quantity of the boxes had been upgraded, the controller 9010 causes a new XAIT to be transmitted, with only the transport section changed to indicate that all further software loads should be performed via HTTP from an HTTP server 9008. The object carousels 9006 with the new code are then shut down and the bandwidth is de-allocated so that it can be used for VOD (or other) sessions again. Any set-top terminals that remain to be upgraded then do so via the HTTP mechanism, with minimum impact on the system.

A similar mechanism can be used for updating the host stack code. In this case, the host code also has at least two upgrade mechanisms. A first mechanism is via a Trivial File Transfer Protocol (TFTP) server 9012, and a second mechanism is via an OpenCable common download carousel 9002. Analogous to the above, the TFTP server 9012 could be shut down, the carousel 9002 activated, the set top terminals allowed to load the new code, and then the carousel deactivated and the TFTP server turned back on.

Given the description of FIG. 6, it will be appreciated that some embodiments of the invention save network bandwidth by removing the object carousel 9006 (or carousel 9002) and only bringing it into play during large volume software upgrades; otherwise utilizing the HTTP upload 9008 (or TFTP upload 9012). When the object carousel is brought on line, bandwidth is temporarily obtained from the DBWAD-allocated video bandwidth. This minimizes the required bandwidth for new software deployment in a video content network, such as a cable system equipped with Tru2way® technology.

Thus, an issue may arise in current use of an object carousel which spools out software images to an MSO's pool of STBs. Such a carousel uses a QAM modulator and typically consumes the entire bandwidth of the modulator at 38 Mbps per 256-QAM. One or more embodiments of the invention reclaim the bandwidth and provide differentiation in the code load images. For example, if a user selects some specific application, such as a clock or other marketable third party application, the same is provided from the HTTP server 9008 via, for example, techniques such as those described in the aforementioned U.S. Provisional Application Ser. No. 61/184,412, or in U.S. application Ser. No. 12/544,357, filed Aug. 20, 2009, of inventor Albert Straub, entitled "User Selection of Software Components in a Television Set-Top Box," the complete disclosure of which is expressly incorporated herein by reference in its entirety for all purposes. However, the default code, which is in the majority, can be handled via the object carousel 9006. The small applications can be loaded after the majority of code has been loaded and the bandwidth de-allocated. In some instances, the 38 Mbps can be shared with additional video content. However, there is an issue of having to employ another MPEG statistical multiplexer for the channel. Thus, simply reusing the VOD channels may be preferable.

In some instances, code is loaded using HTTP or TFTP to pull the different software images up. If both HTTP and the object carousel were to be employed, then twice the bandwidth would, in essence, be consumed. Thus, one or more embodiments take the object carousel offline when the system is in a quiescent, operating-normally state (i.e., not requiring a very large number of boxes to all download at the same time). Advantageously, in one or more embodiments of the invention, if a single STB (or some cases, even some modest number greater than one, such as, e.g., 100 per day) ends up re-booting, its image is picked up from the HTTP server on an as-needed basis that uses a minimal amount of BW.

The aforementioned DBWAD 1001 can be implemented in a variety of different ways. As noted, in some instances, a session resource manager (SRM), or global session resource manager (GSRM), as discussed elsewhere herein, could be employed. In some cases, the functionality can be implemented as a component on another server; e.g., VOD server 105. In Cisco Systems, Inc. (San Jose, Calif., USA) technology, the functionality is known as the Session Resource Manager and is part of the DNCS (Digital Network Control System). Similar functionality may also be referred to as, for example, a bandwidth allocation manager, bandwidth manager, resource manager, or resource allocation manager. The GSRM discussed below, or a different component with similar functionality can be employed.

The GSRM works as follows: the client STB asks the GSRM to allocate bandwidth on the RF infrastructure. The GSRM then marks off in its database that such bandwidth is allocated, and will turn such bandwidth over to the STB. In one or more embodiments of the invention, in a similar fashion, the controller 9010 advises the GSRM in block 1001 that it is about to make available a software upgrade required by many or all of the STBs. In order to avoid flooding the HTTP server 9008 with perhaps 250,000 or even one million requests for new software, controller 9010 requests bandwidth through the GSRM. The GSRM will allocate the requested bandwidth and then it will activate the Open Cable/DSM-CC object carousel 9006, which will then begin transmitting on the allocated bandwidth. The software that needs to be downloaded by most or all of the set top devices is of course loaded onto the object carousel 9006.

In one or more embodiments, at that point, the system signals the set-top boxes that new code is available on the object carousel 9006, on the allocated bandwidth, and the set-top boxes re-boot, due to seeing that the new code is available on the carousel. In one or more embodiments, this can be carried out using the aforementioned XAIT, which is a DSM-CC Open Cable object. This functionality can thus be implemented, for example, through the Open Cable Standard, given the teachings herein. The mass upgrade is thus performed, in one or more embodiments, using the object carousel code.

At some point, a certain number of STBs will have switched to the new code. Once this certain number is sufficiently large (i.e., such that the HTTP server 9008 would not be flooded by the remainder of the STBs accessing the new code from it rather than the carousel), the HTTP server 9008 can take over again. The number of boxes which have switched can be determined, for example, by polling to determine which ones have the newest code, i.e., the system (e.g., controller 9010) "watches" the boxes re-boot. As noted, an example of a controller 9010 is the aforementioned Mystro Application Server (MAS), which can receive a user datagram protocol/internet protocol (UDP/IP) registration message once the set-top box enters into two-way communication mode. The MAS performs the watching and controlling of the switch between Object Carousel and HTTP/TFTP modes.

Once enough boxes have made the change, the HTTP server 9008, as noted, can take over, and then the controller 9010 communicates with DBWAD 1001 to de-allocate the previously-allocated bandwidth. In order to perform that action, in one or more embodiments, controller 9010 changes the XAIT so that the "transport" field now points to the HTTP server 9008. Then controller 9010, as noted, through DBWAD 1001, de-allocates the bandwidth for the DSM-CC Object Carousel 9006, so such bandwidth is relinquished and saved for other uses.

In essence, the set-top boxes have various software programs (SW) on them; these may include, for example, different applications for watching TV, or looking at VOD, and so on, and the software (SW) needs to be updated from time-to-time. Embodiments of the invention provide a way to perform such upgrades using less bandwidth. In one or more embodiments, all elements depicted in FIG. 6 are in the head end 150. The STBs, not shown in FIG. 6, are on the other end of the network ("to RF Plant") as depicted elsewhere herein.

The STBs may, in general, receive in band communications (such as video) from head end 150, as well as out-of-band communications; furthermore, upstream communications from the box to the head end may be carried over the network as well. Non-limiting examples of out-of-band (OOB) data transmission specifications suitable for use with embodiments of the invention include the Data Over Cable Service Interface Specification (DOCSIS), which can be employed with a cable modem, and the Digital Audio Video Council (DAVIC) specification. All versions of the DAVIC specification are expressly incorporated herein by reference in their entirety for all purposes. DOCSIS defines the communications and operation support interface requirements for a data over cable system which permits the addition of high-speed data transfer to an existing Cable TV (CATV) system. It is typically employed to provide Internet access over an existing HFC network infrastructure. A system utilizing the DAVIC specification generally has significantly less bandwidth compared to DOCSIS. For example, the DAVIC system may be allocated a bandwidth of about 50 kbps while the DOCSIS system, with a cable modem, will typically have a bandwidth in a range of about 7 Mbps to about 38 Mbps or higher. Thus, when performing an out-of-band software update, such update can be done via HTTP, but in a point-to-point fashion; i.e., each individual STB communicates with the HTTP server 9008 and initiates a separate request for a new code load. Using such an approach, the HTTP server 9008 should be robust if a number of different requests are likely to be received at the same time.

Therefore, in one or more embodiments, the carousel 9006 (in-band infrastructure) is employed, and a portion of the in-band bandwidth is allocated. The object carousel 9006 is connected on same, with the required code loaded, but now all that is necessary is to tune the STBs to the allocated in-band frequency, mount the object carousel (which appears just like a file system in one or more instances), and then download the components in that fashion. In this way, a relatively small server 9008 can be used to spool the material out over and over to those (few) boxes not upgraded from the carousel. The phrase "object carousel" in some embodiments is interpreted as a re-transmitted FIFO of this file system. All (or at least most) of the STBs can get the new code through this common mode mechanism, so the HTTP server 9008 is not taxed and can be relatively less robust than would otherwise be needed.

Thus, one or more embodiments use an in-band technique to provide SW to the box, wherein the box tunes to a particular channel when it knows that it needs new SW. This could be done, for example, when there is a change for a whole city; for example, rolling out a new version of the ODN (OCAP digital navigator) or some application, so it can be anticipated that there would be a huge demand on the system if it went through the HTTP server 9008; therefore, use the common mode mechanism.

In one or more embodiments, two different carousels 9006, 9002 are present because of the two different types of SW on the STBs, namely, (i) SW which is used for the operating system (OS) and middleware, and (ii) application SW. OS and middleware can be updated by TFTP server 9012 or a common download carousel 9002, so similar techniques could be employed in such cases. In particular, instead of overloading the TFTP server 9012 when every box needs to be upgraded, an analogous mechanism is employed—turn on an in-band common download carousel 9002 and have most or all the set-top boxes (preferably, at least a sufficient number to avoid flooding server 9012 with the remainder, similar to the approach as described above) update through that mechanism, in-band. Thus, in this approach, use the Open Cable Common Download Carousel 9002 not the TFTP server 9012, and place the Open Cable Common Download Carousel 9002 in-band using unused bandwidth through the DBWAD 1001, preferably during a time of limited demand for VOD or SDV, such as late at night (in general, it is preferred that use of VOD or SDV bandwidth for software downloading be carried out at times of limited demand for VOD or SDV, regardless of the type of software application being undertaken).

Thus, by way of review and reiteration, in one or more embodiments, application SW is downloaded from either HTTP server 9008 or DSM-CC object carousel 9006. Some embodiments are directed to delivering application code but shift between 9006 and 9008 to conserve bandwidth and minimize the cost of capital in the head end by not having to have such a large HTTP server 9008 as would be required if the techniques set forth herein were not employed.

Thus, the controller 9010 activates one or more DSM-CC object carousels 9006 and the same provide the new software in-band under direction of DBWAD 1001. Note that DSM-CC object carousels 9006 may be configured in accordance with the digital storage media command and control (DSM-CC) toolkit for developing control channels associated with MPEG-1 and MPEG-2 streams, as defined in part 6 of the MPEG-2 standard (Extensions for DSM-CC), ISO/IEC 13818-1:2000 Information technology—Generic coding of moving pictures and associated audio information: Systems, incorporated herein by reference in its entirety for all purposes. This approach uses bandwidth that would otherwise be used for VOD, and therefore cuts down on the number of people who can order movies. However, there are times when there is limited demand for movies or other VOD assets, and bandwidth (BW) is laying dormant (say, late night). In summary, one or more embodiments take advantage of network downtimes to download the new application code when there is little demand for VOD or SDV, using some of the in-band bandwidth to download the new application code.

Thus, one or more embodiments of the invention overcome the need for each set top terminal to establish a session with the server 9008 when many or all of the boxes require a software upgrade, using a carousel and an in-band broadcast on a channel to which most or all of the set top boxes tune to obtain the new software, preferably during a time of limited VOD demand. A resource manager or other DBWAD, for example, a session resource manager such as the aforementioned GSRM, determines where bandwidth is available on the system, allocates same, advises the carousel of same, and edits the "transport" tag in the XAIT to point the set top box to tune to the particular RF program identifier number to receive the new software from the carousel. The set top box (host) sees the change in the XAIT, causing it to compare the software specified in the XAIT to the SW it is currently running. If there is a difference, the STB will discard the old SW and download the new SW, and then re-boot.

Various criteria can be used to determine when to switch from downloading code via the carousel to downloading code via the (HTTP or TFTP, as the case may be) server. In some instances, the maximum number of software download requests per unit time that can be accommodated by the server will be known (or can be determined) a priori. The rate at which set top boxes are updating from the carousel can then be monitored, and when the number of boxes per unit time that are updating from the carousel is equal to or less than the maximum number of software download requests per unit time that can be accommodated by the server (this constitutes a threshold), download from the carousel can be disabled and download from the server can be enabled. In other cases, it would be possible to switch from downloading code via the carousel to downloading code via the server when a predetermined absolute number of boxes had upgrade from the carousel (or a predetermined percentage of the installed number of boxes, for example).

Figure 7:
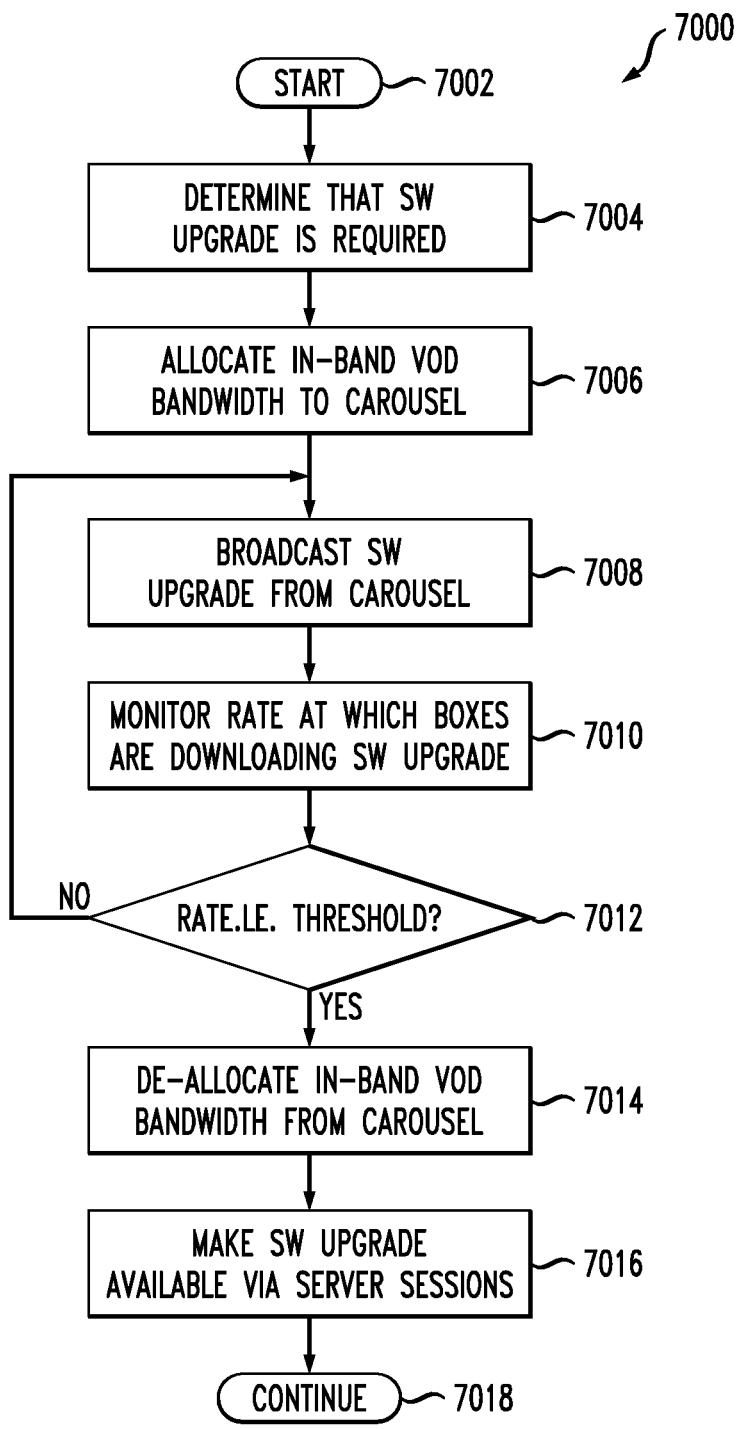
FIG. 7 is a flow chart of exemplary method steps.

Given the description thus far, and with reference now to flow chart 7000 of FIG. 7, it will be appreciated that, in general terms, after beginning at step 7002, an exemplary method, according to an aspect of the invention, includes the step 7004 of determining that a substantial portion (a "substantial portion" is defined herein, in this context, as all the terminals, or a number of terminals so great that the capacity of the HTTP server (or TFTP server, as the case may be) would be exceeded) of set-top terminals connected to a video content network require a software upgrade. Step 7006 includes allocating in-band video bandwidth (e.g., bandwidth reserved for VOD, SDV, and the like) for the software upgrade. Step 7008 includes broadcasting the software upgrade to the set-top terminals from a carousel in a first remote node of the video content network, via the allocated in-band video bandwidth. This continues until a predetermined number of the set-top terminals have received the software upgrade (in some instances, this is decided as per steps 7010 and 7012, as will be discussed further below).

Steps 7014 and 7016 include, subsequent to the predetermined number of the set-top terminals receiving the software upgrade, de-allocating the in-band video (e.g., VOD or SDV) bandwidth, as per step 7014, and making the software upgrade available out-of-band, to a remaining portion of the set-top terminals, via individual sessions with an application server in a second remote node (which, in general, can be the same as, or different from, the first remote node) of the video content network, as per step 7016. Processing continues in block 7018.

In some instances, the predetermined number of set-top terminals is a predetermined fraction of the set-top terminals (e.g., 90%), while in other cases, it may be a predetermined absolute number of the set-top terminals (e.g., 750,000). In some instances, the application server (e.g., 9008 or 9012) has a threshold capacity of a certain number of downloads of the software upgrade per unit time. As depicted in step 7010 and decision block 7012, in such cases, an additional step 7010 includes monitoring, during the broadcasting step 7008, the number of the set-top terminals downloading the software upgrade from the carousel per unit time. The predetermined number corresponds to the number of set-top terminals which have received the software upgrade from the carousel at a point in time when the number of the set-top terminals downloading the software upgrade from the carousel per unit time is no greater than the threshold capacity. In decision block 7012, a determination is made whether the download rate is less than or equal to the threshold capacity; if YES, the processing proceeds to step 7014, while if NO, download from the carousel continues.

Note that in at least some cases, step 7010 can be carried out by noting the number of registrations the new software makes with the MAS (Mystro Application Server).

As noted, in some instances, the application server is a hypertext transfer protocol server 9008 and the carousel comprises a digital storage media command and control object carousel 9006, while in other cases, the application server comprises a trivial file transfer protocol server 9012 and the carousel comprises a common download carousel 9002.

In some cases, the first and second remote nodes are identical and are simply the head end 150 of the video content network.

In some cases, the allocating of the in-band video-on-demand bandwidth in step 7006 includes controller 9010 requesting the in-band video bandwidth, for the carousel, from a dynamic bandwidth allocation device 1001, as well as the controller 9010 indicating, in a transport field of an extended application information table broadcast to the set-top terminals, that the software upgrade is available on the allocated in-band video bandwidth. Furthermore, in some cases, the de-allocating of the in-band video bandwidth in step 7014 includes controller 9010 advising the dynamic bandwidth allocation device 1001 to de-allocate the bandwidth from the carousel, as well as the controller 9010 indicating in the transport field of the extended application information table broadcast to the set-top terminals that the software upgrade is now available via the individual sessions with the application server.

The set-top terminals may thus download the software upgrade in accordance with instructions in an OCAP-compliant XAIT resident on controller 9010 and broadcast out-of-band to the set-top terminals; the transport field of the XAIT may also indicate where the software upgrade is to be obtained from (i.e., in-band via carousel or out-of-band via server session). The transport stream field within the XAIT tells the STB where to obtain the content from—Carousel or HTTP.

In another aspect, an exemplary system is provided for interacting with a plurality of set-top terminals 106 over a video content network 101. The system includes a controller 9010 configured to facilitate determining that a substantial portion of the set-top terminals connected to the video content network require a software upgrade. The system also includes a dynamic bandwidth allocation device 1001, coupled to the controller, configured to allocate in-band video bandwidth on the video content network for the software upgrade. As used herein, "coupled" includes direct coupling and coupling through one or more intermediary components. The system further includes a carousel 9006 and/or 9002, coupled to the controller and the dynamic bandwidth allocation device, and configured to broadcast the software upgrade to the set-top terminals, via the allocated in-band video bandwidth, until a predetermined number of the set-top terminals have received the software upgrade. The system further includes an application server 9008 and/or 9012 coupled to the dynamic bandwidth allocation device and the controller. The controller and the dynamic bandwidth allocation device are cooperatively configured such that, subsequent to the predetermined number of set-top terminals receiving the software upgrade, the in-band video bandwidth is de-allocated and the software upgrade is made available out-of-band, to the remaining portion of the set-top terminals, via individual sessions with the application server over the video content network.

In some cases, the controller 9010, the dynamic bandwidth allocation device 1001, the carousel 9006 and/or 9002, and the application server 9008 and/or 9012 are located in head end 150 of the video content network.

In one or more embodiments, the application server has a threshold capacity as described above and the controller monitors the number of downloads per unit time, as described elsewhere herein.

In one or more embodiments, controller 9010 allocates the in-band video bandwidth by requesting the in-band video bandwidth, for the carousel 9006 and/or 9002, from the dynamic bandwidth allocation device 1001, and indicating, in the transport field of the extended application information table broadcast to the set-top terminals, that the software upgrade is available on the allocated in-band video bandwidth. Furthermore, in one or more embodiments, the controller 9010 de-allocates the in-band video bandwidth by advising the dynamic bandwidth allocation device 1001 to de-allocate the bandwidth from the carousel 9006 and/or 9002, and indicating in the transport field of the extended application information table broadcast to the set-top terminals that the software upgrade is now available via the individual sessions with the application server 9008 and/or 9012.

Exemplary GSRM

A GSRM is a device for dynamically allocating system bandwidth; that is, a non-limiting example of a DBWAD 1001. Motorola, Inc. currently manufactures a GSRM for Time Warner Cable Inc.

One or more embodiments employ session resource management (SRM) functionality to manage video-on-demand and/or switched digital sessions. Preferably, the SRM provides an element that is compatible across a number of head end platforms, such as Motorola, OpenCable, Overlay (SA/Moto) and Scientific-Atlanta (SA). One exemplary embodiment of an SRM is a global session resource manager (GSRM). FIG. 9 shows an exemplary GSRM environment 300, which encompasses an interface to an external policy manager, switched digital video support, and third party entitlement control message generator (ECMG) interfaces. An additional goal is to maintain and reuse currently available interfaces and protocols. Interfaces into an external policy manager may be implemented, for example, via a static XML interface or a dynamic SOAP/XML interface.

GSRM 302 interfaces with conditional access controller 157, which in turn interfaces with digital network control system (DNCS) 308 and TED (transactional encryption device) 310 as well as digital access control system 312 and KLS (key list server) 314. Such interface may employ, for example, open conditional access interface (OCAI) such as SOAP/RPC (remote procedure call). GSRM 302 may also interface with an external policy manager 304, using, for example, extensible markup language (XML(SOAP)) as described in greater detail below. The skilled artisan will appreciate that "SOAP" stands for Simple Object Access Protocol. Also, DNCS 308 may carry out management and CPE configuration analogous to block 308 in FIG. 1a.

Note that a TED is typically present in a system from Cisco Systems, Inc., San Jose, Calif., USA, or a system from Scientific Atlanta (now also part of Cisco Systems, Inc.), and manages the cryptographic keys while the KLS performs analogous functions in systems from Motorola, Inc. of Schaumburg, Ill., USA. These are non-limiting examples of general functionality for managing cryptographic keys. Thus, elements 308, 310 are generally representative of systems from Scientific Atlanta while elements 312, 314 are generally representative of Motorola systems.

Furthermore, the GSRM may interface (for example, using session setup protocol, SSP) with a business management system, such as the Time Warner Cable MYSTRO business management system (BMS) 154. BMS 154 is in turn coupled to billing block 152. The business management system may in turn interface with an application server 104A, such as a Time Warner Cable MYSTRO application server, using, for example, interactive services architecture (ISA). The BMS 154 may also interface with a suitable VOD server 105, such as an ISA VOD system, again, using, for example, ISA.

Yet further, GSRM 302 may interface with a suitable media flow block 322, which may include a video staging system 195, a transcoder and/or transrater 316, a network encrypter 324, and a number of QAMs 318. Communication with block 316 may be, for example, via a suitable transcoder control interface, providing an interface from the GSRM to a transcoder or trans-rater to carry out MPEG manipulation, re-encoding, and the like; communication with block 162 may be, for example, via remote procedure call (RPC) or a suitable network encrypter control interface from GSRM to network encrypter 324; and communication with the QAMs may be, for example, via RPC or edge QAM-C (EQAM-C). Note that in FIG. 1*a*, encryption 324 and modulation 318 are combined in block 162. Element 320 is a router.

MAS 104A may be coupled to DNCS 308 or digital access control system 312 as the case may be.

The skilled artisan will appreciate that a messaging interface from the GSRM to a transcoder or trans-rater device, or to a network encrypter, can be implemented, for example, using RPC (remote procedure call) or RTSP (real time streaming protocol) messaging to outline the characteristics of the desired code, rate, or encryption parameters. A transcoder might, for example, convert from MPEG-2 to MPEG-4, in the case where an end client supports MPEG-4. In the case of a trans-rater or statistical multiplexer type of device, the goal is to fit more video programs into a QAM, so the programs are statistically multiplexed together "on-the-fly."

A suitable switched digital video server 306 may also be provided, including SDV RM (switched digital video resource manager to manage resources assigned to the SDV system) and SDV PM (switched digital video policy manager) functionality (not separately numbered). Communication between GSRM 302 and server 306 may be implemented, for example, using session setup protocol server initiated session (SSP-SIS). Server 306 may communicate with QAMs 318 via RPC or EQAM-C. A set top terminal or box (STB) 106 may communicate with VOD server 105 via, for example, lightweight stream control protocol (LSCP); with SDV server 306 via, for example, channel change protocol (CCP); and with GSRM 302 via, for example, session setup protocol (SSP).

Figure 10:
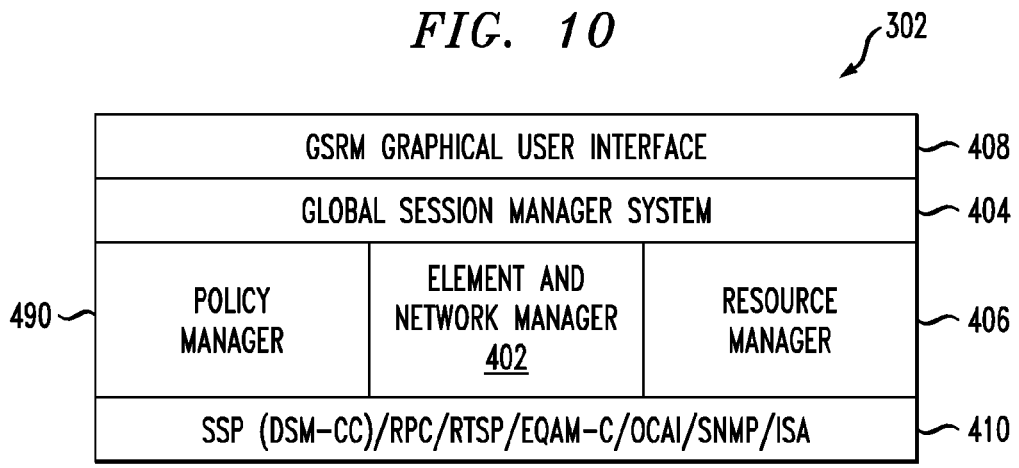
FIG. 10 shows exemplary components of a session resource manager.

As shown in FIG. 10, the SRM 302 encompasses three major functions, namely, element and network manager 402, session manager 404, and policy manager 490. In the first function, the element manager 402 provides provisioning and configuration information for the edge devices (e.g., edge QAMS 318) and network encrypter 324. The second function 404 handles the assignment of network and RF resources for devices generating session requests. Additionally, the SRM 302 needs access, via a secure interface, to the conditional access (CA) system 157 to provide for content security. The third function, policy manager 490, provides the ability to allocate these resources based on pre-determined and real time policies as related to the type of asset and/or program requesting bandwidth from the network, in addition to predetermined techniques that can be used when such policies do not apply. The internal policy manager 490 receives rule-sets via an XML file and/or supports a SOAP/XML interface for real time policy decisions.

In some instances, the SRM functionality resides physically on the VOD server 105, while in other cases it is split between two entities, the VOD server 105 and a session resource manager of the DNCS 308. Other approaches can also be employed.

The Element and Network Manager component 402 is responsible for a number of functions. Listed below is an overview of the primary components:

A provisioning system for edge devices, video servers, switched digital video servers, network encrypter, network elements, switches, and the like.

Monitoring of various network components to provide SRM engine ability to make session decisions based on available resources.

Managing entitlement messages and conditional access keys, when applicable.

Ability to provide a graphical representation of network components and related interconnects, including setting under/over-provisioning of interconnects.

Ability to provide a graphical interface 408 for designing and managing the network topology and interfaces.

The network manager preferably constantly monitors network usage and reports congestion, failures, downed links, and the like. A significant aspect of the network manager is to provide high (for example, 99.99%) uptime of the network for the delivery of video services. In addition, the network manager is preferably able to proactively provide alternate links (when available) to traffic to minimize service interruptions and stream/session failures.

In a preferred embodiment, to provide the operator with suitable monitoring capabilities, the network manager provides the ability to show the current network utilization of any device and interconnect links. The information is preferably provided in a graphical manner to the operator and highlights any troublesome or failed devices or connections (for example, using the graphical user interface (GUI) 408. A layer representing the various communications protocols is shown at 410.

Figure 11:
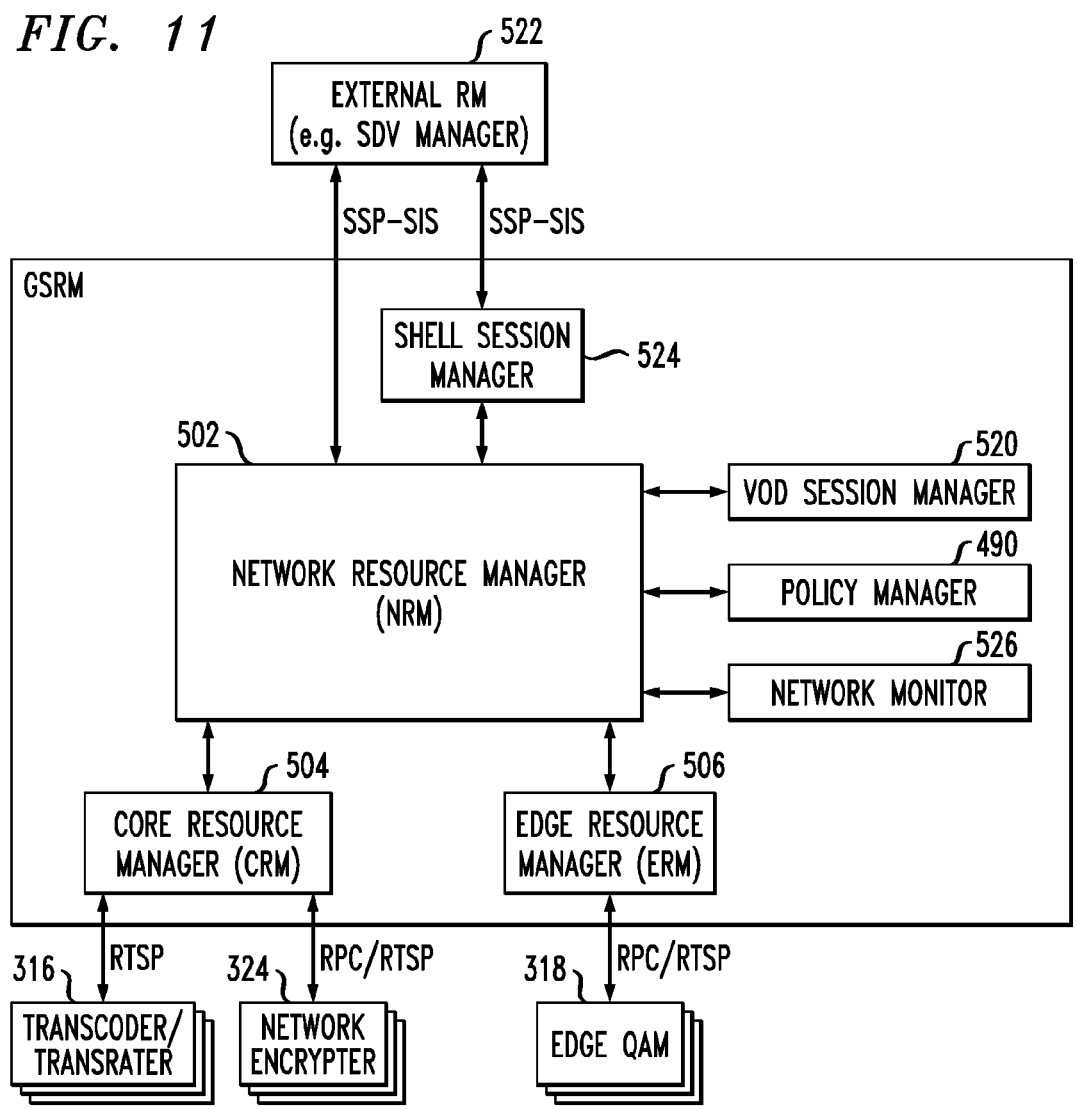
FIG. 11 shows additional details of an exemplary session resource manager in its environment.

As shown in FIG. 11, resource manager 406 preferably includes network resource manager (NRM) 502, core resource manager (CRM) 504, and edge resource manager (ERM) 506. The NRM 502 is responsible for receiving resource requests from the session managers (VOD 520, SDV 522, Shell 524, and so on). After the NRM receives the request, it will then look at what is needed to service the request (encryption, bandwidth, and the like) and then make the requests from the core and edge resource managers 504, 506. The NRM 502 needs to be aware of all of the network (core and edge) resources and their state, so it can make session resource decisions. For instance, if an edge device does not support encryption and the session needs to be encrypted, then the NRM must use the appropriate core encryption device to encrypt the session. Functionally, the NRM, CRM and ERM may be bundled as one process and/or component, or as separate processes and/or components. Note that RTSP stands for real-time streaming protocol. The network monitoring functionality is shown at 526.

With regard to policy manager 490, in one or more embodiments, with business rules manager enabled, session allocation and most network resources can be assigned based on a pre-defined set of business rules. For example, a high-definition (HD) VOD session may be given preference over a free on-demand session. While this is one example, the system is preferably modular, extensible and configurable to allow operators to set the parameters of the business rules engine.

It is also preferred that an operator can determine rules and parameters for the loading of network elements and connections. Instead of purely looking at business rules, new techniques and static configurations may be used for allocating resources on a per-stream and/or per-session or product basis. Some versions of the policy manager (PM) 490 inside the GSRM may allow for XML import of static policy rule sets. Preferably, the GSRM provides a GUI 408 for setting the policies and modifying them. The PM 490 may also support a dynamic policy interface via SOAP/XML to an external policy manager system 304.

A significant function of the session manager (SM) 404 is to provide the mechanism for session requests to receive the proper conduit for the delivery of video. The primary responsibility of the SM is for handling DSM-CC session requests from a VOD client residing on a client device (e.g. STB, and the like). Each time a session is created, the SM must communicate with policy manager 490 and resource manager 406 to determine the best route for the session to be streamed and also determine if, where, and how the session will be set up based on the system policies. Additionally, the GSRM will provide the application server 104 with the appropriate information to determine the type of stream to be created (e.g. MPEG-4 Advanced Video Codec (AVC)) and conditional access method. Non-limiting examples of conditional access methods include the Cisco PowerKEY® conditional access system (registered mark of Cisco Systems, Inc., San Jose, Calif., USA) for a set-top box or the Motorola MediaCipher™ system (mark of Motorola, Inc. of Schaumburg, Ill., USA).

The session manager also works in a split model with SDV manager 522 to receive session requests (pre-provisioned/shell or exclusive/provision) for allocating network resources for this request. It is the responsibility of the GSRM to provide a shell session manager to track and manage shell session requests from an external session manager. The shell session manager should maintain a list of granted shell sessions, even through a reboot, power outage, etc. Additionally, the shell session manager should provide reconciliation tools for the external session manager (e.g. SDV server 306) and query tools for status checking with QAMs.

Figure 12:
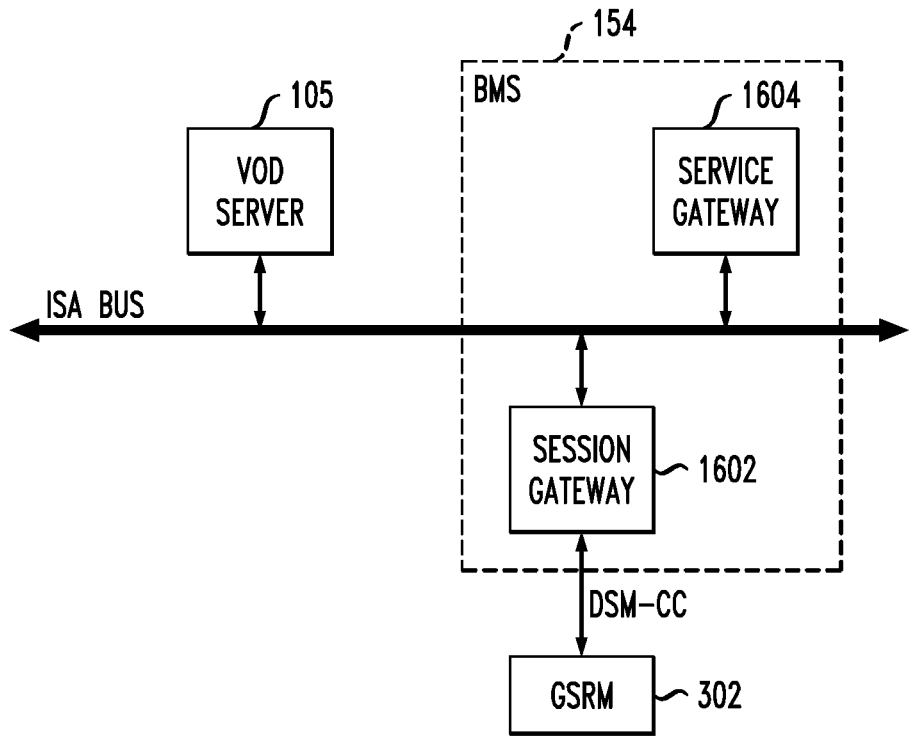
FIG. 12 shows a session manager to session gateway component.

As seen in FIG. 12, in some instances, a session gateway process 1602 resides on the BMS 154 and serves as the entry point for session messaging from DSM-CC to ISA. The GSRM 302 forwards all VOD session communication along to the session gateway and the BMS in turn forwards it to the service gateway 1604. FIG. 12 outlines an exemplary interface structure of the session gateway process residing in the BMS.

Figure 13:
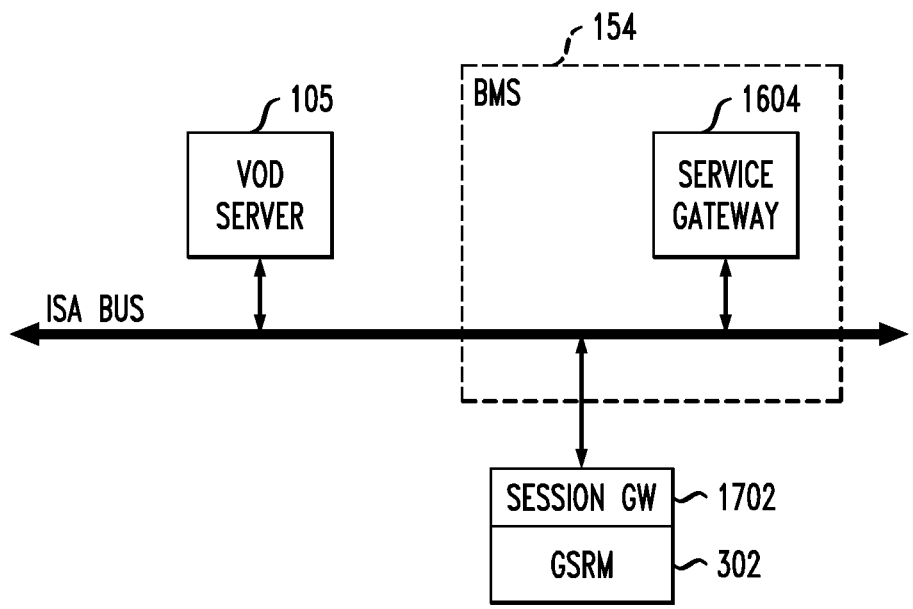
FIG. 13 shows a session manager to service gateway component.

Reference should now be had to FIG. 13. In some instances, the GSRM and ISA VOD infrastructure may gain certain efficiencies in session setup speed and reliability by moving the session gateway process 1602 onto the GSRM, as shown at 1702 in FIG. 13. The GSRM would then communicate directly to the service gateway 1604 on the ISA bus. Inasmuch as part of the client session request is a descriptor for the service gateway, the GSRM would use this descriptor to pass the appropriate session request information to the referenced service gateway.

The ISA bus is primarily directed towards using Common Object Request Broker Architecture (CORBA) for messaging the ISA interfaces. Direct communication of the GSRM to the service gateway would require the GSRM to implement the appropriate ISA and CORBA interfaces. Other alternatives to the CORBA interface include SOAP/XML.

It is preferred that a variety of different interfaces be supported by GSRM and the related components and processes, so as to permit interface with hardware and software from many manufacturers, such as Motorola, Scientific-Atlanta and Overlay (Moto/SA) systems. The aforementioned SSP reflects an implementation of the ISO/IEC 13818 MPEG-2 DSMCC specification.

The SRM 302 manages a pool of HFC and network resources across many edge devices (e.g., edge QAMS 318) and reaching multiple service groups. Note that core devices may include, for example, network encrypters, transcoders, statistical multiplexers, and the like. For the setup of a particular session, the SRM allocates resources from the aforementioned pool. The qualified resources are determined by the service group specified by the STB 106. A mechanism that indicates that an edge device has been removed from service, and thereby its resources must be removed from the allocation pool, is provided in one or more embodiments. The element manager 402 configures the edge device with static configuration information such as modulation mode, transport ID (frequency), as well as provisioning the MPEG-2 multi-program transport stream. This information must be communicated to the SRM so that is can be transmitted to the STB along with session specific information during session set-up.

Service applications and clients communicate to the SRM using the session setup protocol, an implementation of DSM-CC. Certain parameters such as retransmission rate for the messages are not defined within the specification. These must be defined or left as configurable parameters for the SRM. In some instances, these messages are actually passed through the session gateway to provide a distributed object interface for the sessions.

In SSP, the client 106 sends a client session request to the GSRM 302 to begin the session establishment. This request contains information for identifying the service group as well as information pertinent to the server application. The GSRM verifies the message integrity and passes it along to the server with which the session is desired (e.g., VOD server 105, BMS 154, application server 104). The server makes a server add resource request to the SRM, including the amount of downstream bandwidth, MPEG Program and server conditional access. Also included is the Ethernet descriptor if the application desires to indicate a preference. In another aspect, the "server add resource" request may include only a source parameter, allowing the GSRM 302 to respond with the appropriate resources.

The SM will determine resource availability after consulting with the resource manager 406 and policy manager 490. If the resources are available, the GSRM 302 will allocate the appropriate resources and signal an indication of success back to the server. If the system requires encryption, the GSRM 404 will send a suitable request for same to the DNCS CA Manager (CAM) 157. If the requested resources are available, the CAM will reply with a confirmation. The GSRM 302 then will send the appropriate CA credentials to the client and encryption device.

At this point, the server provides a response in which the IP address of the service entry point is specified. In case of failure, the GSRM adds the resources back to the pool. The GSRM uses the HFC resources allocated from the pool to construct a confirmation including modulation mode, transport ID, bandwidth, client conditional access and service entry IP address. The SRM handles a client release request message to allow the client to abort in progress session setups. Once the session has been created, the application server 104 and/or VOD System 105 will create the appropriate stream for the client.

The GSRM's role as the "global" resource manager places it in the position to manage, monitor and control the network (incl. HFC) resources for sessions. To provide a robust QAM sharing ability, the GSRM must be the central arbiter between VOD and SDV sessions. SDV Server 306 will reside external to the GSRM server and will utilize the SSP-SIS extensions to request session bandwidth. The SDV server may request this bandwidth using one of a few methods:

Shell session (pre-provision)
    Exclusive session (shell or RM provisioned)
    Combination of shell and exclusive The GSRM is preferably agile enough to handle all these modes simultaneously from an external SDV system 306.

Since Network Resources become more valuable and scarce with each session request from clients and servers, the GSRM preferably provides a method for arbitrating these requests. The GSRM sets session thresholds based on product type for VOD (e.g., free on demand (FOD), movies on demand (MOD), subscription video on demand (SVOD), etc.) and switched digital video (SDV). The MSO can define the name of the product and amount of allowable sessions per service group. In addition, the system provides a way to proactively request session resources back from a client and/or SDV manager. A ceiling can be prescribed by product and/or service and when the ceiling is exceeded requests and/or teardowns could be done on the least preferable sessions (for instance, FOD). The described functionality provides a level of policy control on the sessions being allocated by the GSRM. The GSRM preferably provides the ability to easily support an external policy manager 304 via a SOAP/XML interface that provides extended capabilities.

The Session Resource Manager functionality may reside on a single component such as a VOD server or may be spread across multiple components. In one or more embodiments, the Session Resource Manager (SRM) is the central mechanism for aligning head end resources to establish a peer-to-peer connection between the video server and the end user's set-top box (STB). A sub-component of the SRM is the actual bandwidth allocation technique. With the addition of High Definition Video-On-Demand to the current offering of Standard Definition Video-On-Demand, appropriate techniques should be employed to support the commingling of High Definition Video-On-Demand (HDVOD) and Standard Definition Video-On-Demand (SDVOD) content and the establishment of Quality of Service (QoS) guarantees between the two different services.

The narrowcast bandwidth of the VOD service group is arguably the most expensive bandwidth within the cable system. Video server streams, transport, switching fabric, QAMs, RF-combining and distribution all contribute to this cost, which is distributed over a relatively small subset of subscribers. Additionally, this narrowcast bandwidth is re-created over and over again to provide service to all subscribers. One or more embodiments optimize the utilization of this expensive bandwidth. Regardless of the infrastructure or of the protocol or which component is actually performing the allocation (Business Management System (BMS) 154; Digital Network Control System (DNCS) 308 or VOD Server 105) it is preferred, for operational predictability, that any or all of the components optimize and allocate the bandwidth in the same manner.

When performing traffic model analysis, significant variables that contribute to the performance of the system are the probability of the arrival of the session setup request and the probability of the session hold-time. These variables contribute to the loading factor with respect to a blocking factor, which ultimately determines the number of resources required to serve a given population of users.

Historically, when working with a single encode rate the system-blocking factor was based on the VOD Service Group. With the commingling of different encode rates, a new blocking factor is introduced into the system. This is the QAM blocking factor, and it is based on the probability of having enough bandwidth to support an HD session within a given QAM. While there may be enough bandwidth within the VOD Service Group to support an HD session, if it is not all available on a single QAM channel, the HD session is blocked and the bandwidth is considered "stranded" with regard to its ability to support an HD session. This occurs when the bandwidth consumption on a given QAM exceeds the max rate of the QAM minus the HD rate or, for example, 37.5 Mbps–15 Mbps equaling 22.5 Mbps.

Additionally, the probability of whether the next session request to arrive is either a SD or HD session factors into the allocation technique. This probability is based on multiple factors including HD STB penetration rates, buy rates, demographics and content availability. The hold-time of a session will also be impacted based on the length of HD content offered.

The allocation models presented herein represent a view of the allocation of sessions by ignoring the hold-time of sessions. Presenting this material without representing the departure of session does not invalidate the allocation technique as session hold-time, and thus session departure, has been factored into the allocation models. The reason that it does not invalidate the allocation technique is that each allocation decision is made at the time of session setup with the most current snapshot of bandwidth allocations across all QAMs within the service group.

While the examples are centered around SD content encoded at 3.75 Mbps and HD content at 15 Mbps the allocation technique can easily support multiple SD and multiple HD encode rates by tuning the various parameters. Additionally, service groups with greater than four RF channels are easily supported without any changes.

Assumptions for the examples include:

1. Each VOD Service Group includes four 6 MHz RF channels running QAM256.
2. The Standard Definition (SD) rate is 3.75 Mbps. The High Definition (HD) rate is 15 Mbps or four times the SD rate. Thus, the bandwidth requirement for HD is four times that of SD.
3. Every QAM256 channel has the capacity or payload to transport 37.5 Mbps of MPEG-2 video out of a total capacity of 38.8 Mbps. The additional QAM bandwidth is reserved for overhead for encryption, sessions, etc.
4. Although the specification uses sessions as a simplified unit of measure for bandwidth, all decisions are really based on bandwidth and not the number of sessions of a particular rate.
5. The bandwidth utilization and allocation within a QAM does not experience fragmentation as occurs within RAM memory stacks. Thus, there is not the problem of seeking a "largest free block" as all the remainder bandwidth is available for allocation.

Several new variables are introduced in order to provide control of how bandwidth is allocated per service group. They are the VType(2)_Session_Limit and the VType(1)_Session_Limit. Control and flexibility can be attained when these two variables are used in conjunction with an optimized allocation technique.

Configuring the system with hard limits and not oversubscribing the system will reserve bandwidth and guarantee service for each individual service. Configuring the system in an oversubscription model (defining the sum of both variables to a value greater than the total capacity) allows for a floating pool of resources that will be allocated as requests arrive. Oversubscription has the advantage that the bandwidth is not stranded through the reservation process, if there are no requests for that service, while at the same time providing QoS guarantees. The following examples illustrate this.

EXAMPLE 1

VType(2)_Session_Limit=32 and VType(1)_Session_Limit=2: The hard limits reserve the bandwidth and guarantee service for both SDVOD and HDVOD—in this case 32 SD sessions and 2 HD sessions. Even if there are no HD sessions and the 33rd SD session request arrives, it will be denied.

EXAMPLE 2

VType(2)_Session_Limit=40 and VType(1)_Session_Limit=8: In this totally over-subscribed example setting the variables to their theoretical maximum values allows the system to operate freely without any controls, first come first served.

EXAMPLE 3

VType(2)_Session_Limit=40 and VType(1)_Session_Limit=2: This example allows the possibility of no more than two HD sessions, but does not guarantee them while allowing up to 40 SD sessions.

EXAMPLE 4

VType(2)_Session_Limit=32 and VType(1)_Session_Limit=8: This example allows the possibility of 32 SD sessions and reserves bandwidth for two HD sessions while supporting the possibility of eight HD sessions.

The allocation technique is preferably optimized to:
Support configurability for a "Least Loaded" and a "Most Loaded" session allocation model
Compromise between load balancing across QAMs and HD session support
Enable lowest impact on active session in the event of failures
Increase the probability of having capacity for an HD session
Establish a mechanism to manage a QoS of SD and HD sessions within a VOD Service Group
Implement business rules guaranteeing service levels for both SD and HD sessions
Support multiple SD and multiple HD encode rates
Support varying number of channels per service group
Allow dynamic tuning of network utilization To maintain parity among implementations of the technique, the following variables types are employed.
VType(n)_Threshold: The variable represents the upper bandwidth threshold to switch between the least loaded model to the most loaded model.
VType(n)_Session_Limit: The variable represents the maximum number of simultaneous VType sessions within a VOD Service Group.
VType(n)_Rate: The rate of the VType CODEC.
VType(n)_Session_Count: The variable refers to the number of current VType Sessions.
VType(n): Defines the CODEC type as one of the following HD-MPEG-2 @ 15 Mbps, SD-MPEG-2 @ 3.75 Mbps, HD-H.264 @ 7.5 Mbps, SD-H.264 @ 1.875 Mbps (the H.264 rates are only listed as an example)
VType(1): HD-MPEG-2 @ 15 Mbps
VType(2): SD-MPEG-2 @ 3.75 Mbps
VType(3): HD-H.264 @ 7.5 Mbps
VType(4): SD-H.264 @ 1.875 Mbps
. . .
. . .
VType(n): CODEC @ Mbps An initial technique only accounts for MPEG-2 CODEC streams, it being understood that other CODEC and bit-rates can be defined in other versions. In some instances, the VType(1)_Threshold may be set to max bandwidth in a QAM minus the HD encode rate (e.g. 37.5−15=22.5). Once the bandwidth utilization within a QAM for a VOD Service Group reaches this threshold, the allocation technique will start stacking sessions on the least loaded QAM over the VType(1)_Threshold value.

By manipulating the VType(1)_Threshold value, the system's performance can be tuned based on the contention found in the system. By setting the VType(1)_Threshold to 37.5 Mbps (the max QAM bandwidth), the technique will allocate in a "least loaded" technique.

Since HD sessions require four times the amount of bandwidth when compared to SD sessions, there needs to be a way of limiting the number of HD sessions so that they cannot use all the bandwidth within a service group, which can result in denial of service. Limiting the number of HD sessions allows for the theoretical reservation of enough bandwidth to support SD VOD sessions. Conversely, limiting the number of SD allows for the theoretical reservation of enough bandwidth to support HD VOD sessions.

Reference should now be had to FIG. 14. Once the VType(1)_Threshold is reached across any QAM within a service group, the technique should start stacking sessions on the QAM channel that has passed VType(1)_Threshold. This method of allocating sessions will increase the probability of having the capacity to support an HD stream. This will allow a mix of 36 SD sessions and one HD session as shown in the figure.

In essence, the session requests that are provisioned below the VType(1)_Threshold are allocated across the QAMs within a VOD Service Group in a "least loaded" model and session requests that are allocated above the VType(1)_Threshold are allocated in a "most loaded" model. The following are exemplary steps to allocate bandwidth:

1. Determine if the session setup request is either a VType(1)_Rate or VType(2)_Rate
2. Compare the VType(2)_Session_Limit or the VType(1)_Session_Limit to the new request type and then deny the session setup request if it equals the session limit type (QoS test) else
3. Check the bandwidth utilization across all the QAMs within a VOD Service Group and determine the lowest bandwidth utilization
4. If the lowest bandwidth utilization is below the HD_Threshold value on any QAM, then allocate the bandwidth on the least loaded QAM that has the requested capacity available (if the first QAM does not have the capacity try the next— QAM1→QAM2→QAM3→QAM4→ . . . QAM#n) else
5. Allocate the bandwidth on the most loaded QAM above the VType(1)_Threshold value QAM that has the requested capacity available (if the first QAM does not have the capacity try the next QAM— QAM1→QAM2→QAM3→QAM4→ . . . QAM#n)

By allocating sessions in the manner described above, the session allocation would, in one non-limiting example, appear as in FIG. 15. In this example:

Session 1 through 24 are below the VType(1)_Threshold and are allocated in a "least loaded" model 25th SD session request is above the VType(1)_Threshold and is allocated on the first most loaded QAM channel. In this example, it would be on QAM 1.

26th HD session request is above the VType(1)_Threshold and is allocated on the first QAM with enough available bandwidth to support the HD session. In this example, it would be on QAM2.

27th and 28th SD session requests are above the VType (1)_Threshold and are allocated on the first most loaded QAM channel. In this example, it would be on QAM1.

29th HD session request is above the VType(1)_Threshold and is allocated on the first QAM with enough available bandwidth to support the HD session. In this example, it would be on QAM3.

30th SD session request is above the VType(1)_Threshold and is allocated on the first most loaded QAM channel. In this example, it would be on QAM1.

31st, 32nd, 33rd and 34th SD session requests are above the VType(1)_Threshold and are allocated on the first most loaded QAM channel. In this example, it would be on QAM4.

System and Article of Manufacture Details

The invention can employ hardware and software aspects. Software includes but is not limited to firmware, resident software, microcode, etc. One or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code for performing the method steps indicated. Furthermore, one or more embodiments of the invention or elements thereof can be implemented in the form of an apparatus including a memory and at least one processor that is coupled to the memory and operative to perform, or facilitate performance of, exemplary method steps.

Yet further, in another aspect, one or more embodiments of the invention or elements thereof can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a tangible computer-readable recordable storage medium (or multiple such media). Appropriate interconnections via bus, network, and the like can also be included.

Figure 8:
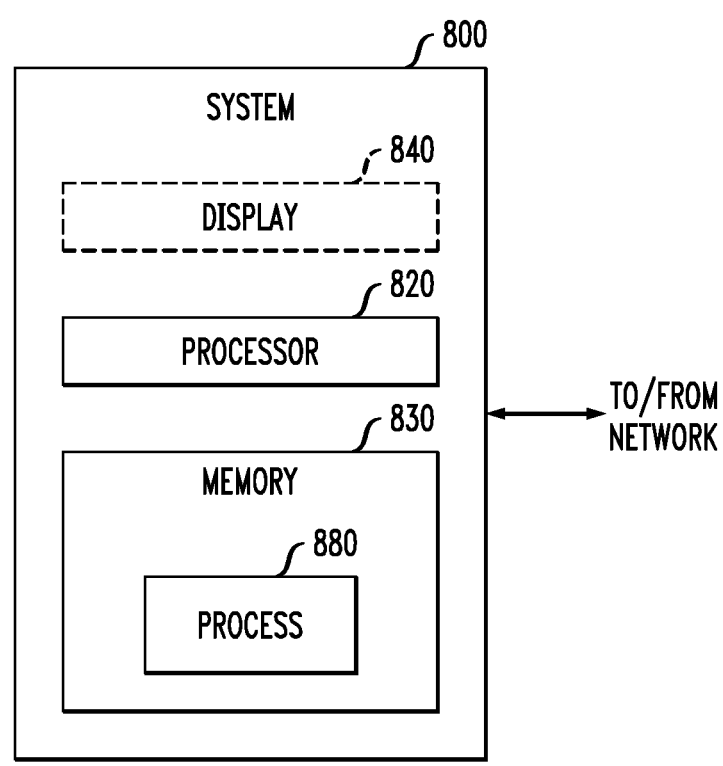
FIG. 8 is a block diagram of an exemplary computer system useful in implementing at least a portion of one or more embodiments of the invention.

FIG. 8 is a block diagram of a system 800 that can implement part or all of one or more aspects or processes of the present invention, processor 820 of which is representative of processors associated with servers, clients, and other elements with processing capability depicted in the other figures (e.g., application distribution servers 104, VOD server 105, CPE 106 with processor 702, a processor of the server in FIG. 2 which executes the process 202, server 600 with processor 602, common download carousel 9002, DBWAD 1001 (including any of its possible instantiations, such as an SRM or GSRM), object carousel 9006, HTTP server 9008, software provisioning system 9010, TFTP server 9012, and so on—note that the carousels are typically servers with processors). In one or more embodiments, inventive steps are carried out by one or more of the processors in conjunction with one or more interconnecting network(s).

As shown in FIG. 8, memory 830 configures the processor 820 to implement one or more aspects of the methods, steps, and functions disclosed herein (collectively, shown as process 880 in FIG. 8). The memory 830 could be distributed or local and the processor 820 could be distributed or singular. The memory 830 could be implemented as an electrical, magnetic or optical memory, or any combination of these or other types of storage devices. It should be noted that if distributed processors are employed, each distributed processor that makes up processor 820 generally contains its own addressable memory space. It should also be noted that some or all of computer system 800 can be incorporated into an application-specific or general-use integrated circuit. For example, one or more method steps could be implemented in hardware in an ASIC rather than using firmware. Display 840 is representative of a variety of possible input/output devices.

As is known in the art, part or all of one or more aspects of the methods and apparatus discussed herein may be distributed as an article of manufacture that itself includes a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic medium or height variations on the surface of a compact disk. As used herein, a tangible computer-readable recordable storage medium is intended to encompass a recordable medium, examples of which are set forth above, but is not intended to encompass a transmission medium or disembodied signal.

The computer systems and servers described herein each contain a memory that will configure associated processors to implement the methods, steps, and functions disclosed herein. Such methods, steps, and functions can be carried out, e.g., by processing capability on individual elements in the other figures, or by any combination thereof. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Thus, elements of one or more embodiments of the present invention can make use of computer technology with appropriate instructions to implement method steps described herein.

As used herein, including the claims, a "server" includes a physical data processing system (for example, system 800 as shown in FIG. 8) running a server program. It will be understood that such a physical server may or may not include a display, keyboard, or other input/output components.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include any or all of the components shown in the figures (e.g. modules/submodules for server process 202, client process 204, applications and modules in FIGS. 3 and 5, modules to implement functionality of the blocks in FIG. 6, to perform the method steps in FIG. 7, modules to implement SRM, GSRM, or other DBWAD functionality or functionality associated therewith, and so on). The method steps can then be carried out using the distinct software modules of the system, as described above, executing on the one or more hardware processors (e.g., a processor or processors in the set-top terminal and a processor or processors in the head end or other network node). Further, a computer program product can include a tangible computer-readable recordable storage medium with code adapted to be executed to carry out one or more method steps described herein, including the provision of the system with the distinct software modules.

Non-limiting examples of languages that may be used include markup languages (e.g., hypertext markup language (HTML), extensible markup language (XML), standard generalized markup language (SGML), and the like), C/C++, assembly language, Pascal, Java, EBIF—Extended Binary Interchange Format language, and the like. Note that EBIF would typically only be employed in connection with a set-top box.

Accordingly, it will be appreciated that one or more embodiments of the invention can include a computer program including computer program code means adapted to perform one or all of the steps of any methods or claims set forth herein when such program is implemented on a processor, and that such program may be embodied on a tangible computer readable recordable storage medium. Further, one or more embodiments of the present invention can include a processor including code adapted to cause the processor to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising the steps of:
   determining a software upgrade for a plurality of consumer premises equipment connected to a video content network;
   allocating in-band video bandwidth for said software upgrade;
   broadcasting said software upgrade to said plurality of consumer premises equipment from a first remote node of said video content network, via said allocated in-band video bandwidth, until a predetermined number of said consumer premises equipment have received said software upgrade; and
   subsequent to said predetermined number of said consumer premises equipment receiving said software upgrade and a number of said consumer premises equipment downloading said software upgrade from said first remote node per unit time falling below a threshold capacity of a certain number of downloads per unit time of a second remote node, de-allocating said in-band video bandwidth and providing said software upgrade, out-of-band, to at least one remaining consumer premises equipment of the plurality of consumer premises equipment, via individual sessions with said second remote node of said video content network.

2. The method of claim 1, wherein said predetermined number comprises a predetermined fraction of said consumer premises equipment.

3. The method of claim 1, wherein said predetermined number comprises a predetermined absolute number of said consumer premises equipment.

4. The method of claim 1, wherein said second remote node comprises a hypertext transfer protocol server and said first remote node comprises a digital storage media command and control object carousel.

5. The method of claim 1, wherein said second remote node comprises a trivial file transfer protocol server and said first remote node comprises a common download carousel.

6. The method of claim 1, wherein said first and second remote nodes are identical and comprise a head end of said video content network.

7. The method of claim 1, wherein:
   said allocating of said in-band video bandwidth comprises a controller:
      requesting said in-band video bandwidth, for said first remote node, from a dynamic bandwidth allocation device; and
      indicating, in a transport field of an extended application information table broadcast to said consumer premises equipment, that said software upgrade is available on said allocated in-band video bandwidth; and
   said de-allocating of said in-band video bandwidth comprises said controller:
      advising said dynamic bandwidth allocation device to de-allocate said bandwidth from said first remote node; and
      indicating in said transport field of said extended application information table broadcast to said consumer premises equipment that said software upgrade is available via said individual sessions with said second remote node.

8. A system for interacting with a plurality of consumer premises equipment over a video content network, said system comprising:
   a controller configured to facilitate determining a software upgrade for said plurality of consumer premises equipment connected to a video content network;
   a dynamic bandwidth allocation device, coupled to said controller, configured to allocate in-band video bandwidth on the video content network for said software upgrade;
   a first remote node, coupled to said controller and said dynamic bandwidth allocation device, configured to broadcast said software upgrade to said plurality of consumer premises equipment, via said allocated in-band video bandwidth, until a predetermined number of said consumer premises equipment have received said software upgrade; and a second remote node coupled to said dynamic bandwidth allocation device and said controller;

wherein said controller and said dynamic bandwidth allocation device are cooperatively configured such that, subsequent to said predetermined number of said consumer premises equipment receiving said software upgrade and a number of said consumer premises equipment downloading said software upgrade from said first remote node per unit time falling below a threshold capacity of a certain number of downloads per unit time of said second remote node, said in-band video bandwidth is de-allocated and said software upgrade is provided, out-of-band, to at least one remaining consumer premises equipment of the plurality of consumer premises equipment, via individual sessions with said second remote node over the video content network.

9. The system of claim 8, wherein said predetermined number comprises a predetermined fraction of said consumer premises equipment.

10. The system of claim 8, wherein said predetermined number comprises a predetermined absolute number of said consumer premises equipment.

11. The system of claim 8, wherein said second remote node comprises a hypertext transfer protocol server and said first remote node comprises a digital storage media command and control object carousel.

12. The system of claim 8, wherein said second remote node comprises a trivial file transfer protocol server and said first remote node comprises a common download carousel.

13. The system of claim 8, wherein said controller, said dynamic bandwidth allocation device, said first remote node, and said second remote node are located in a head end of the video content network.

14. The system of claim 8, wherein:
said controller allocates said in-band video bandwidth by:
requesting said in-band video bandwidth, for said first remote node, from said dynamic bandwidth allocation device; and
indicating, in a transport field of an extended application information table broadcast to said consumer premises equipment, that said software upgrade is available on said allocated in-band video bandwidth; and
said controller de-allocates said in-band video bandwidth by:
advising said dynamic bandwidth allocation device to de-allocate said bandwidth from said first remote node; and
indicating in said transport field of said extended application information table broadcast to said consumer premises equipment that said software upgrade is now available via said individual sessions with said second remote node.

15. An apparatus comprising:
means for determining a software upgrade for a plurality of consumer premises equipment connected to a video content network;
means for allocating in-band video bandwidth for said software upgrade;
means for broadcasting said software upgrade to said plurality of consumer premises equipment from a first remote node of said video content network, via said allocated in-band video bandwidth, until a predetermined number of said consumer premises equipment have received said software upgrade; and means for, subsequent to said predetermined number of said consumer premises equipment receiving said software upgrade and a number of said consumer premises equipment downloading said software upgrade from said first remote node per unit time falling below a threshold capacity of a certain number of downloads per unit time of a second remote node, de-allocating said in-band video bandwidth and providing said software upgrade, out-of-band, to at least one remaining consumer premises equipment of the plurality of consumer premises equipment, via individual sessions with said second remote node of said video content network;

wherein said means for determining, said means for allocating, said means for broadcasting, and said means for de-allocating each comprise at least one of:
hardware modules; and
software modules, said software modules being:
stored in a non-transitory manner in a tangible computer-readable recordable storage medium, loaded into a memory, and
executed on at least one hardware processor coupled to said memory.

16. A computer program product comprising a tangible computer readable recordable storage medium having computer readable program code stored thereon in a non-transitory manner, said computer readable program code comprising:
computer readable program code configured to determine a software upgrade for a plurality of consumer premises equipment connected to a video content network;
computer readable program code configured to allocate in-band video bandwidth for said software upgrade;
computer readable program code configured to broadcast said software upgrade to said plurality of consumer premises equipment from a first remote node of said video content network, via said allocated in-band video bandwidth, until a predetermined number of said consumer premises equipment have received said software upgrade; and
computer readable program code configured to, subsequent to said predetermined number of said consumer premises equipment receiving said software upgrade and a number of said consumer premises equipment downloading said software upgrade from said first remote node per unit time falling below a threshold capacity of a certain number of downloads per unit time of a second remote node, de-allocate said in-band video bandwidth and provide said software upgrade, out-of-band, to at least one remaining consumer premises equipment of the plurality of consumer premises equipment, via individual sessions with said second remote node of said video content network.

17. The computer program product of claim 16, wherein said predetermined number comprises a predetermined fraction of said consumer premises equipment.

18. The computer program product of claim 16, wherein said predetermined number comprises a predetermined absolute number of said consumer premises equipment.

19. The computer program product of claim 16, wherein said second remote node comprises a hypertext transfer protocol server and said first remote node comprises a digital storage media command and control object carousel.

20. The computer program product of claim 16, wherein said second remote node comprises a trivial file transfer protocol server and said first remote node comprises a common download carousel.

21. The computer program product of claim 16, wherein said first and second remote nodes are identical and comprise a head end of said video content network.

22. The computer program product of claim 16, wherein:
said computer readable program code configured to allocate said in-band video bandwidth comprises:
   computer readable program code configured to request said in-band video bandwidth, for said first remote node, from a dynamic bandwidth allocation device; and
   computer readable program code configured to indicate, in a transport field of an extended application information table broadcast to said consumer premises equipment, that said software upgrade is available on said allocated in-band video bandwidth; and
said computer readable program code configured to de-allocate said in-band video bandwidth comprises:
   computer readable program code configured to advise said dynamic bandwidth allocation device to de-allocate said bandwidth from said first remote node; and
   computer readable program code configured to indicate in said transport field of said extended application information table broadcast to said consumer premises equipment that said software upgrade is now available via said individual sessions with said second remote node.

* * * * *